US 11,764,893 B2

(12) United States Patent
Cavaliere et al.

(10) Patent No.: US 11,764,893 B2
(45) Date of Patent: Sep. 19, 2023

(54) APPARATUS AND METHODS FOR A TRANSPORT NETWORK

(71) Applicant: TELEFONAKTIEBOLAGET LM ERICSSON (PUBL), Stockholm (SE)

(72) Inventors: Fabio Cavaliere, Pisa (IT); Paola Iovanna, Pisa (IT); Filippo Ponzini, Pisa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/493,478

(22) PCT Filed: Mar. 22, 2017

(86) PCT No.: PCT/EP2017/056810
§ 371 (c)(1),
(2) Date: Sep. 12, 2019

(87) PCT Pub. No.: WO2018/171879
PCT Pub. Date: Sep. 27, 2018

(65) Prior Publication Data
US 2020/0076528 A1     Mar. 5, 2020

(51) Int. Cl.
*H04J 14/00*     (2006.01)
*H04J 14/02*     (2006.01)

(52) U.S. Cl.
CPC ........ *H04J 14/0282* (2013.01); *H04J 14/025* (2013.01); *H04J 14/0226* (2013.01); *H04J 14/0246* (2013.01)

(58) Field of Classification Search
CPC .............. H04J 14/0282; H04J 14/0226; H04J 14/0246; H04J 14/025
See application file for complete search history.

(56) References Cited

U.S. PATENT DOCUMENTS

2003/0091274 A1*   5/2003   Vohra ................... H04J 14/0228
                                                                   385/24
2004/0114867 A1*   6/2004   Nielsen ................. G02F 1/0147
                                                                   385/40

(Continued)

FOREIGN PATENT DOCUMENTS

WO         2013004310 A1     1/2013

OTHER PUBLICATIONS

Jarmila Mullerova, "On wavelength blocking for XG-PON coexistence with GPON and WDM-PON networks", Jul. 2012, Transparent Optical Networks (ICTON), All pages (Year: 2012).*

(Continued)

*Primary Examiner* — Pranesh K Barua
(74) *Attorney, Agent, or Firm* — Christopher & Weisberg, P.A.

(57) ABSTRACT

A method in a first level aggregation node of a transport network is disclosed. The transport network comprises the first level aggregation node, a second level aggregation node and a Passive Optical Network. T the method comprises receiving, from the second level aggregation node, a plurality of wavelength division multiplexing (WDM) channels having wavelengths in a first spectrum section and generating at least one passive optical channel having a wavelength in a second spectrum section, different to the first spectrum section. The method further comprises combining at least some of the WDM channels received from the second level aggregation node with the at least one passive optical channel, and forwarding the combined WDM channels and passive optical channel to a termination node in the Passive Optical Network. Also disclosed are a method in a termination node of a transport network, a first level aggregation node, a termination node and a computer program.

17 Claims, 17 Drawing Sheets

(56) References Cited

U.S. PATENT DOCUMENTS

| | | | | |
|---|---|---|---|---|
| 2007/0212072 | A1* | 9/2007 | Iannone | H04J 14/0252 |
| | | | | 398/72 |
| 2008/0063397 | A1 | 3/2008 | Hu et al. | |
| 2010/0054740 | A1* | 3/2010 | Lee | H04J 14/0247 |
| | | | | 398/68 |
| 2010/0290782 | A1* | 11/2010 | Lee | H04Q 11/0005 |
| | | | | 370/254 |
| 2012/0201543 | A1* | 8/2012 | Inoue | H04B 10/291 |
| | | | | 398/83 |
| 2013/0089336 | A1* | 4/2013 | Dahlfort | H04J 14/0282 |
| | | | | 398/115 |
| 2014/0219660 | A1* | 8/2014 | Zhu | H04J 14/0246 |
| | | | | 398/67 |
| 2016/0381441 | A1* | 12/2016 | Nagamine | H04B 10/503 |
| | | | | 398/95 |
| 2018/0175935 | A1* | 6/2018 | Du | H04J 14/0287 |
| 2019/0037286 | A1* | 1/2019 | Ghuman | H04J 14/0291 |

OTHER PUBLICATIONS

International Search Report, dated May 12, 2017, from corresponding/related International Application No. PCT/EP2017/056810.
Written Opinion, dated May 12, 2017, from corresponding/related International Application No. PCT/EP2017/056810.
Paola Ivanna et al., A Future Proof Optical Network Infrastructure For 5G Transport, IEEE vol. 8, Issue 12, Dec. 2016.

* cited by examiner

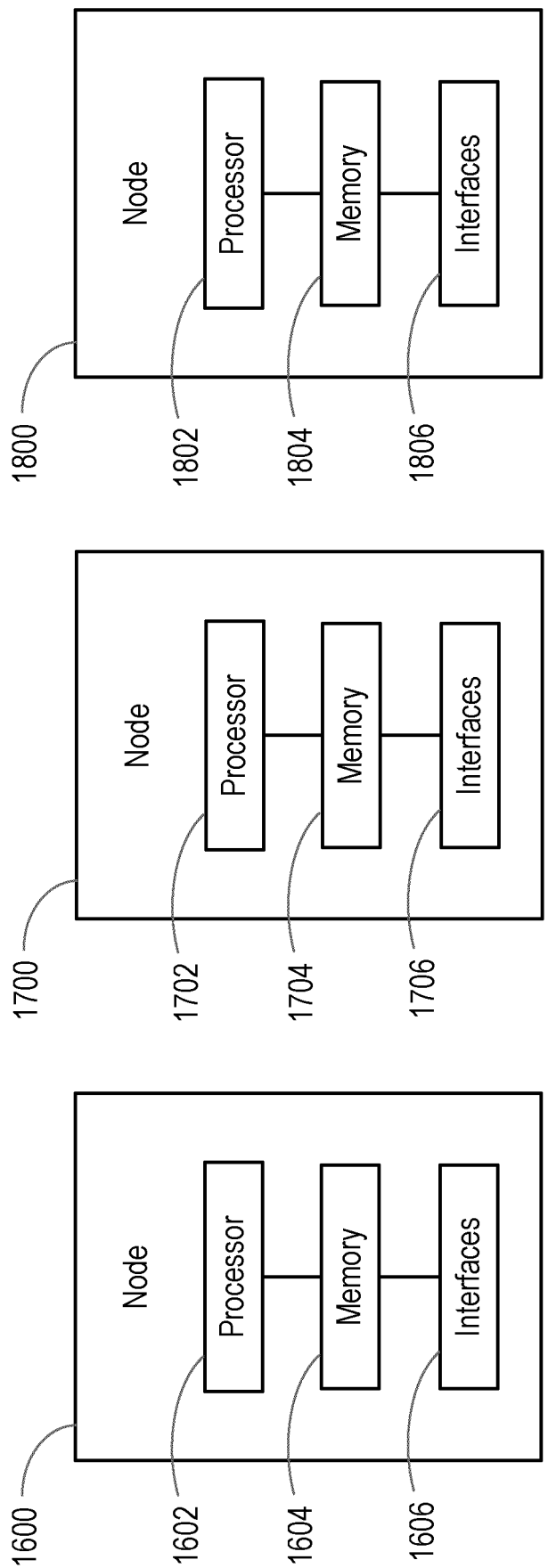

APPARATUS AND METHODS FOR A TRANSPORT NETWORK

TECHNICAL FIELD

The present disclosure relates to methods and nodes in a transport network. The transport network comprises first and second level aggregation nodes and a passive optical network. The present disclosure also relates to a computer program.

BACKGROUND

In cellular communication networks, radio base stations (RBS) provide radio network coverage over a coverage area or cell. Communication links between the RBSs of a network and the communication network core segment are referred to as the Mobile Backhaul (MBH) or backhaul. In traditional architectures, both radio and baseband processing are performed in the RBS, which outputs an Ethernet signal which is then transported over the MBH using microwave and/or optical fibre. In some implementations, RBSs may be separated into one or more radio units and one or more baseband processing units, enabling, among other advantages, the optimising of radio unit placement. The radio units may be referred to as Remote Radio Units (RRUs) or as Radio Equipments (REs). The baseband processing units may be referred to as Baseband Units (BBUs), Digital Units (DUs) or as Radio Equipment Controllers (RECs). The communication links between REs and RECs in such deployments are collectively referred to as the Mobile Fronthaul (MFH) or fronthaul. The Common Public Radio Interface (CPRI) specifies an internal interface protocol for the MFH, managing RBS communication between REs and RECs. In addition to CPRI New Radio split (named NR) are under definition and that may require an intermediate scenario with respect to the CPRI interface between fronthaul and traditional backhaul. Conventionally the case of NR interface is named backhaul.

The Xhaul paradigm proposes the combination of MFH and MBH in a common connectivity segment, with the aim of implementing the technological shift that will be required of 5G communication networks. Xhaul proposes the concurrent transport of CPRI traffic from REs towards a centralised REC pool, and Ethernet traffic from conventional RBSs or New Radio towards further aggregations stages. Xhaul is one example of a Centralised/Cloud Radio Access Network (CRAN) transport solution for 5G that enables maximising of advantages offered by pooling BBUs and transport equipment, while respecting the tight constraints imposed on latency and bandwidth in 5G.

Xhaul uses Dense Wavelength Division Multiplexing (DWDM) transmission and is mostly designed for ring infrastructures, as illustrated in FIG. 1. FIG. 1 shows a basic Xhaul network 100 with a hub node 102 and three remote nodes 104, the hub and remote nodes connected via a DWDM ring infrastructure 106. The hub node 102 hosts pooled BBU devices and a transport unit that aggregates the traffic to be transported to Remote Nodes (RNs) 104. Each Remote node supports a cluster of RRUs, with the traffic to/from each cluster aggregated at the RN level and sent on the DWDM channels that connect the RNs 104 to the hub node 102. One or more wavelengths may be assigned to each RN 104 according the amount of traffic managed by each RN.

FIG. 2 illustrates in greater detail the building blocks of an Xhaul network such as the network 100 of FIG. 1. As discussed above, the hub node 102 comprises several pooled BBUs and serves a plurality of Remote Nodes 104, each RN serving a cluster of antennas. The connection between hub node 102 and Remote Nodes 104 is performed through DWDM channels. In the hub node 102, a time-deterministic switch 108, based on a framing protocol designed ad hoc, enables the aggregation of heterogeneous client signals (CPRI, Ethernet, new generation fronthaul interfaces in new radio split options, etc.). The aggregated traffic is then assigned to a wavelength and transmitted to the RNs. The RNs drop the appropriate wavelengths, terminate the client signals and send them to the corresponding RRUs. A central component of an Xhaul network is a control system that allows for dynamic reconfiguring of traffic, how traffic is aggregated in different wavelengths, and how the wavelengths are assigned to the remote nodes, according to the traffic load or operator needs.

In contrast to the Radio Access Network, the installed infrastructure of the fixed access network is usually based on Gigabit Passive Optical Network (GPON) technology. GPON is a fiber access technology based on point to multipoint access mechanisms. FIG. 3 illustrates the main building blocks of a fixed access GPON 300, including an Optical Line Terminal (OLT) 302 and Optical Network Terminations (ONTs) 304. The OLT 302 is usually located in a central office about 2-3 Km distant from ONTs 304, which are placed near to premises of a fixed access subscriber. Passive splitters 306 are used to create a tree (i.e. point-to-multipoint) infrastructure.

Some communication network operators are looking for a common infrastructure for GPON and CRAN, according to which antennas 308 would be connected to some drop fibers of the GPON. Connected antennas 308 and ONTs 304 would share the same trunk fiber 310 of the GPON, as illustrated in FIG. 4.

GPONs are widespread, hence in principle it would be convenient to reuse the same infrastructure for fronthaul and backhaul purposes (i.e. Xhaul). However, there are several obstacles to such an arrangement, as set out below.

In the downstream, GPON uses a single optical channel with individual time slots assigned to the ONTs according to a time division multiplexed (TDM), approach. This causes bandwidth limitations that are unlikely to be compatible with 5G requirements. In the upstream, GPON uses Time Division Multiplexing Access (TDMA), according to which the ONTs request access to a single shared upstream wavelength. In addition to bandwidth limitations, similar to those experienced in the downstream, issues for 5G operation would be caused by delay asymmetry between upstream and downstream and unpredictable latency and performance of radio links, which would depend on the number and bandwidth of active residential ONTs. The adoption of rigid scheduling policies could mitigate these issues but would unacceptably degrade the throughput of the fixed access network.

An additional fundamental issue with reusing GPON infrastructure for CRAN is that the GPON bandwidth is too narrow for 5G. GPON bandwidth is 2.5 Gbit/s, to be shared among one or more ONT(s). A higher shared bandwidth of 10 Gbit/s can be achieved with XG-PON but this infrastructure was not widely installed for cost reasons, and the higher bandwidth is still not sufficient for 5G. A shared bandwidth of 40 Gbit/s, sufficient for 5G, can be achieved by NG-PON2 with Time-Wavelength Division Multiplexing (TWDM), however this architecture is also not widely available and the fixed/mobile traffic segregation issues highlighted above remain. A further obstacle to reusing the GPON infrastructure for CRAN is distance: the typical distance between an OLT and ONTs in a GPON is about 2-3-Km, while the CRAN aims to reach much longer distances, of for example 20 Km in fronthaul, to fully exploit the centralisation advantages offered by CRAN.

Reuse of GPON for fronthaul and backhaul purposes, while attractive in view of the widespread deployment of GPONs, thus presents significant challenges in terms of practical realisation.

SUMMARY

It is an aim of the present disclosure to provide a method and apparatus which obviate or reduce at least one or more of the disadvantages mentioned above.

According to a first aspect of the present disclosure, there is provided a method in a first level aggregation node of a transport network, the transport network comprising the first level aggregation node, a second level aggregation node and a Passive Optical Network. The method comprises receiving, from the second level aggregation node, a plurality of wavelength division multiplexing (WDM) channels having wavelengths in a first spectrum section and generating at least one passive optical channel having a wavelength in a second spectrum section, different to the first spectrum section. The method further comprises combining at least some of the WDM channels received from the second level aggregation node with the at least one passive optical channel and forwarding the combined WDM channels and passive optical channel to a termination node in the Passive Optical Network.

According to examples of the present disclosure, the first spectrum section may comprise the C-band of 1525-1565 nm, and the second spectrum section may be centred on 1300 nm. Example wavelengths for the at least one passive optical channel include the GPON channel wavelengths of 1490 nm and 1310 nm.

According to examples of the present disclosure, the method may further comprise inputting the WDM channels received from the second level aggregation node to at least one wavelength selective element, a said wavelength selective element configured to act on a single channel wavelength to perform one of dropping the channel wavelength or bypassing the channel wavelength. According to such examples, combining at least some of the WDM channels received from the second level aggregation node with the at least one passive optical channel may comprise combining those WDM channels bypassed by the at least one wavelength selective element with the at least one passive optical channel.

According to examples of the present disclosure, the WDM channels received from the second level aggregation node may be input to a plurality of wavelength selective elements, each wavelength selective element configured to act on a different single channel wavelength.

According to examples of the present disclosure, the WDM channels received from the second level aggregation node may carry data signals for at least one of a Radio Access Network, an enterprise network, and/or a fixed access network.

According to examples of the present disclosure, the data signals for a Radio Access Network may comprise at least one of fronthaul signals and/or backhaul signals.

According to examples of the present disclosure, the method may further comprise splitting the WDM channels received from the second level aggregation node into downstream and upstream WDM channels, and inputting each of the downstream and upstream WDM radio access channels to a dedicated plurality of wavelength selective elements.

According to examples of the present disclosure, the method may further comprise combining WDM channels bypassed by each dedicated plurality of wavelength selective elements.

According to examples of the present disclosure, the first level aggregation node may comprise an Optical Line Terminal of the Passive Optical Network, and generating at least one passive optical channel having a wavelength in a second spectrum section, different to the first spectrum section, may comprise generating the at least one passive optical channel in the Optical Line Terminal.

According to examples of the present disclosure, the first level aggregation node may further comprise a reconfigurable remote node of a combined fronthaul and backhaul network, and the second level aggregation node may comprise a hub node of the combined fronthaul and backhaul network.

According to examples of the present disclosure, the method may further comprise performing baseband processing on at least one WDM channel dropped by a wavelength selective element.

According to examples of the present disclosure, the method may further comprise returning the baseband processed WDM channel to the plurality of WDM channels via the at least one wavelength selective element.

According to examples of the present disclosure, the method may further comprise causing at least one WDM channel dropped by a wavelength selective element to be extinguished.

According to examples of the present disclosure, the method may further comprise configuring the plurality of wavelength selective elements to pass WDM channels allocated to WDM termination nodes connected to the Passive Optical Network.

According to examples of the present disclosure, the method may further comprise configuring the plurality of wavelength selective elements to pass WDM channels allocated to WDM termination nodes directly connected to the first level aggregation node.

According to examples of the present disclosure, the method may further comprise receiving a control signal indicating WDM channels allocated to WDM termination nodes connected to the Passive Optical Network and/or directly connected to the first level aggregation node. The WDM termination nodes may for example be RRUs, small cells, macro antennas etc.

According to another aspect of the present disclosure, there is provided a method in a termination node of a transport network, the transport network comprising a first level aggregation node, a second level aggregation node and a Passive Optical Network. The method comprises receiving, from the first level aggregation node, a combined signal including a plurality of WDM channels having wavelengths in a first spectrum section and a passive optical channel having a wavelength in a second spectrum section, different to the first spectrum section. The method further comprises splitting the passive optical channel from the WDM channels and forwarding the passive optical channel to a destination node for the passive optical channel. The method further comprises forwarding at least some of the WDM channels to destination nodes for the WDM channels, or dropping at least some of the WDM channels as a destination node for the WDM channels.

According to examples of the present disclosure, the destination node for the passive optical channel may for example be or be located at a premises of a fixed access subscriber. According to examples of the present disclosure, the destination nodes for the WDM channels may for example be macro/small antennas, RRU sites, enterprise or fixed access sites or any other termination point for traffic transmitted on the particular WDM channel.

According to examples of the present disclosure, the termination node may comprise a termination node of the Passive Optical Network.

According to examples of the present disclosure, the termination node may for example be an Optical Network Termination (ONT).

According to examples of the present disclosure, the method may further comprise inputting the WDM channels to at least one wavelength selective element, a said wavelength selective element configured to act on a single channel wavelength to perform one of dropping the channel wavelength or bypassing the channel wavelength. According to such examples, forwarding at least some of the WDM channels to destination nodes for the WDM channels may comprise forwarding those WDM channels bypassed by the at least one wavelength selective element.

According to examples of the present disclosure, the WDM channels received from the second level aggregation node may be input to a plurality of wavelength selective elements, each wavelength selective element configured to act on a different single channel wavelength.

According to examples of the present disclosure, the WDM channels may carry data signals for at least one of a Radio Access Network, an enterprise network, and/or a fixed access network.

According to examples of the present disclosure, the data signals for a Radio Access Network may comprise at least one of fronthaul signals and/or backhaul signals.

According to examples of the present disclosure, the method may further comprise causing at least one WDM channel dropped by a wavelength selective element to be extinguished.

According to examples of the present disclosure, the method may comprise causing all dropped WDM channels to be extinguished.

According to examples of the present disclosure, causing at least one WDM channel dropped by a wavelength selective element to be extinguished may comprise performing at least one of attenuating or tapering on the channel.

According to examples of the present disclosure, the method may further comprise configuring the plurality of wavelength selective elements to pass WDM radio access channels allocated to destination nodes connected to the termination node.

According to examples of the present disclosure, the method may further comprise receiving a control signal indicating WDM radio access channels allocated to destination nodes connected to the termination node.

According to another aspect of the present disclosure, there is provided a method in a termination node of a transport network, the transport network comprising a first level aggregation node, a second level aggregation node and a Passive Optical Network. The method comprises receiving a WDM channel for transmission over the transport network and setting each of a plurality of wavelength selective elements to drop the channel on which they act, each wavelength selective element configured to act on a different single channel wavelength to perform one of dropping the channel wavelength or bypassing the channel wavelength. The method further comprises sweeping a tuneable laser over WDM wavelengths including a target transmission wavelength, inputting the signal of the tuneable laser to the plurality of wavelength selective elements and monitoring power on a drop output of each of the wavelength selective elements. The method further comprises, when the power on the drop output of the wavelength selective element corresponding to the target transmission wavelength reaches a transmission threshold, stopping the sweep of the tuneable laser, setting the wavelength selective element corresponding to the target transmission wavelength to bypass and transmitting the received WDM channel on the target transmission wavelength via the tuneable laser.

According to examples of the present disclosure, the steps of the method of the preceding aspect may also be performed as part of the method of the first aspect of the present disclosure.

According to examples of the present disclosure, the method may further comprise receiving a signal indicating the target transmission wavelength.

According to examples of the present disclosure, the signal may be received via the first level aggregation node in the transport network.

According to examples of the present disclosure, the method may further comprise, during transmission of the received WDM channel on the target transmission wavelength, monitoring power on the drop output of the wavelength selective element corresponding to the target transmission wavelength. If the power on the drop output of the wavelength selective element corresponding to the target transmission wavelength reaches a reset threshold, the method may further comprise performing at least one of stopping transmission of the WDM channel, resetting the wavelength selective element corresponding to the target transmission wavelength to drop the channel on which it acts and restarting sweep of the tuneable laser; or adjusting the wavelength of the tuneable laser until the power on the drop output of the wavelength selective element corresponding to the target transmission wavelength falls below the reset threshold.

According to examples of the present disclosure, the reset threshold may be lower than the transmission threshold.

According to another aspect of the present disclosure, there is provided a first level aggregation node of a transport network, the transport network comprising the first level aggregation node, a second level aggregation node and a Passive Optical Network. The first level aggregation node comprises an input for receiving, from the second level aggregation node, a plurality of Wavelength Division Multiplexing, WDM, channels having wavelengths in a first spectrum section. The first level aggregation node further comprises a generator for generating at least one passive optical channel having a wavelength in a second spectrum section, different to the first spectrum section, and a combiner for combining at least some of the WDM channels received from the second level aggregation node with the at least one passive optical channel. The first level aggregation node further comprises an output for forwarding the combined WDM and passive optical channel to a termination node in the Passive Optical Network.

According to examples of the present disclosure, the first spectrum section may comprise the C-band of 1525-1565 nm, and the second spectrum section may be centred on 1300 nm. Example wavelengths for the at least one passive optical channel include the GPON channel wavelengths of 1490 nm and 1310 nm. According to examples of the present disclosure, the WDM channels may carry data signals for at least one of: a Radio Access Network, an enterprise network, and/or a fixed access network, and the data signals for a Radio Access Network may comprise at least one of fronthaul signals and/or backhaul signals.

According to examples of the present disclosure, the first level aggregation node may further comprise at least one wavelength selective element, the wavelength selective element configured to act on a single channel wavelength to perform one of dropping the channel wavelength or bypassing the channel wavelength. According to such examples, the combiner may be configured to combine those WDM channels bypassed by the at least one wavelength selective element with the at least one passive optical channel.

According to examples of the present disclosure, the first level aggregation node may comprise a plurality of wavelength selective elements, each wavelength selective element configured to act on a different single channel wavelength.

According to examples of the present disclosure, the first level aggregation node may further comprise a splitter for splitting the WDM channels received from the second level aggregation node into downstream and upstream WDM channels, and a first plurality of wavelength selective elements for upstream WDM channels and a second plurality of wavelength selective elements for downstream WDM channels.

According to examples of the present disclosure, the first level aggregation node may further comprise a combiner for combining WDM channels passed by each dedicated plurality of wavelength selective elements.

According to examples of the present disclosure, the generator may comprise an Optical Line Terminal of the Passive Optical Network.

According to examples of the present disclosure, the first level aggregation node may further comprise a baseband processing unit for performing baseband processing on at least one WDM channel dropped by a wavelength selective element.

According to examples of the present disclosure, the at least one wavelength selective element may comprise a micro-ring resonator.

According to examples of the present disclosure, the at least one wavelength selective element may further comprises at least one of a taper or an attenuator coupled to a drop port of the micro-ring resonator.

According to examples of the present disclosure, the at least one wavelength selective element may comprise at least one of an optical attenuator or switch coupled to an output port of an optical demultiplexer and an input port of an optical multiplexer.

According to examples of the present disclosure, the optical demultiplexer and multiplexer may comprise Arrayed Wave Gratings.

According to another aspect of the present disclosure, there is provided a termination node of a transport network, the transport network comprising a first level aggregation node, a second level aggregation node and a Passive Optical Network. The termination node comprises an input for receiving, from the first level aggregation node, a combined signal including a plurality of WDM channels having wavelengths in a first spectrum section and a passive optical channel having a wavelength in a second spectrum section, different to the first spectrum section. The termination node further comprises a splitter for splitting the passive optical channel from the WDM channels, a first output for forwarding the passive optical channel to a destination node for the passive optical channel and a second output for forwarding at least some of the WDM channels to destination nodes for the WDM channels or dropping at least some of the WDM channels as a destination node for the WDM channels.

According to examples of the present disclosure, the destination node for the passive optical channel may for example be a premises of a fixed access subscriber etc.

According to examples of the present disclosure, the destination nodes for the WDM channels may for example be macro/small antennas, RRU sites, enterprise or fixed access sites or any other termination point for traffic transmitted on the particular WDM channel.

According to examples of the present disclosure, the termination node may comprise a termination node of the Passive Optical Network.

According to examples of the present disclosure, the termination node may for example be an Optical Network Termination (ONT).

According to examples of the present disclosure, the termination node may further comprise at least one wavelength selective element, the wavelength selective element configured to act on a single channel wavelength to perform one of dropping the channel wavelength or bypassing the channel wavelength. According to such examples, the second output may be for forwarding or dropping those WDM channels passed by the at least one wavelength selective element to destination nodes for those WDM channels.

According to examples of the present disclosure, the termination node may comprise a plurality of wavelength selective elements, each wavelength selective element configured to act on a different single channel wavelength.

According to examples of the present disclosure, the at least one wavelength selective element may comprise a micro-ring resonator.

According to examples of the present disclosure, the at least one wavelength selective element may further comprise at least one of a taper or an attenuator coupled to a drop port of the micro-ring resonator.

According to examples of the present disclosure, the at least one wavelength selective element may comprise at least one of an optical attenuator or switch coupled to an output port of an optical demultiplexer and an input port of an optical multiplexer.

According to examples of the present disclosure, the optical demultiplexer and multiplexer may comprise Arrayed Wave Gratings.

According to examples of the present disclosure, the termination node may further comprise an input for receiving a WDM channel for transmission over the transport network, a tuneable laser for sweeping over WDM wavelengths including a target transmission wavelength, a plurality of wavelength selective elements, each wavelength selective element configured to act on a different single channel wavelength to perform one of dropping the channel wavelength or bypassing the channel wavelength, and a plurality of monitors for monitoring power on a drop output of each of the wavelength selective elements.

According to examples of the present disclosure, the monitoring elements may comprise photodiodes.

According to examples of the present disclosure, the termination node may further comprise an input for receiving a signal indicating the target transmission wavelength, and that the signal may be received via a first level aggregation node in the transport network.

According to another aspect of the present disclosure, there is provided a first level aggregation node of a transport network, the transport network comprising the first level aggregation node, a second level aggregation node and a Passive Optical Network. The first level aggregation node comprises a processor and a memory, the memory containing instructions executable by the processor such that the node is operable to receive, from the second level aggregation node, a plurality of WDM channels having wavelengths in a first spectrum section, generate at least one passive optical channel having a wavelength in a second spectrum section, different to the first spectrum section, combine at least some of the WDM channels received from the second level aggregation node with the at least one passive optical channel, and forward the combined WDM channels and passive optical channel to a termination node in the Passive Optical Network.

According to another aspect of the present disclosure, there is provided a termination node of a transport network, the transport network comprising a first level aggregation node, a second level aggregation node and a Passive Optical Network. The termination node comprises a processor and a memory, the memory containing instructions executable by the processor such that the node is operable to receive, from the first level aggregation node, a combined signal including a plurality of WDM channels having wavelengths in a first spectrum section and a passive optical channel having a wavelength in a second spectrum section, different to the first spectrum section, split the passive optical channel from the WDM channels and forwarding the passive optical channel to a destination node for the passive optical channel, and forward at least some of the WDM channels to destination nodes for the WDM channels or drop at least some of the WDM channels as a destination node for the WDM channels.

According to another aspect of the present disclosure, there is provided a first level aggregation node of a transport network, the transport network comprising the first level aggregation node, a second level aggregation node and a Passive Optical Network. The first level aggregation node is adapted to receive, from the second level aggregation node, a plurality of WDM channels having wavelengths in a first spectrum section, generate at least one passive optical channel having a wavelength in a second spectrum section, different to the first spectrum section, combine at least some of the WDM channels received from the second level aggregation node with the at least one passive optical channel, and forward the combined WDM channels and passive optical channel to a termination node in the Passive Optical Network.

According to another aspect of the present disclosure, there is provided a termination node of a transport network, the transport network comprising a first level aggregation node, a second level aggregation node and a Passive Optical Network. The termination node is adapted to receive, from the first level aggregation node, a combined signal including a plurality of WDM channels having wavelengths in a first spectrum section and a passive optical channel having a wavelength in a second spectrum section, different to the first spectrum section, split the passive optical channel from the WDM channels and forwarding the passive optical channel to a destination node for the passive optical channel, and forward at least some of the WDM channels to destination nodes for the WDM channels or drop at least some of the WDM channels as a destination node for the WDM channels.

According to another aspect of the present disclosure, there is provided a computer program comprising instructions which, when executed on at least one processor, cause the at least one processor to carry out a method according to any one of the preceding aspects or examples of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

According to another aspect of the present disclosure, there is provided a transport network comprising a first level aggregation node according to a preceding aspect of example of the present disclosure, a second level aggregation node, and a Passive Optical Network, the passive optical network comprising a termination node according to a preceding aspect of example of the present disclosure.

According to another aspect of the present disclosure, there is provided a transport network comprising a first level aggregation node configured to terminate at least one passive optical channel and to bypass at least one Wavelength Division Multiplexed (WDM) channel, the at least one WDM channel having a wavelength in a first spectrum section and the at least one passive optical channel having a wavelength in a second spectrum section, different to the first spectrum section. The transport network further comprises a second level aggregation node configured to terminate the at least one WDM channel bypassed by the first level aggregation node, and a Passive Optical Network.

According to examples of the present disclosure, the first level aggregation node may be configured to carry out a method according to a preceding aspect of example of the present disclosure.

According to examples of the present disclosure, the transport network may further comprise a termination node configured to transfer at least some of the WDM channels bypassed by the first level aggregation node to a destination for the WDM channels.

According to examples of the present disclosure, the termination node may be configured to carry out a method according to a preceding aspect of example of the present disclosure.

BRIEF DESCRIPTION OF THE DRAWINGS

For a better understanding of the present disclosure, and to show more clearly how it may be carried into effect, reference will now be made, by way of example, to the following drawings in which:

FIG. 16 is a block diagram illustrating functional units in another example of first level aggregation node of a transport network;

FIG. 17 is a block diagram illustrating functional units in another example of termination node of a transport network;

FIG. 18 is a block diagram illustrating functional units in another example of termination node of a transport network.

DETAILED DESCRIPTION

Aspects of the present disclosure propose a transport network comprising first and second level aggregation nodes and a Passive Optical Network. The first level aggregation nodes may receive WDM optical channels from a second level aggregation node, and combine at least some of these received signals with at least one passive optical channel generated at the first level aggregation node, before forwarding the combined signal to a termination node of the passive optical network. The WDM channels may have wavelengths in a first spectrum section, with the passive optical channel or channels having wavelengths in a second spectrum section, different from the first spectrum section. The transport network may for example combine the Passive Optical Network with a WDM infrastructure which may for example carry fronthaul and/or backhaul signals. The WDM infrastructure may be a tree or a ring infrastructure, and may be a DWDM infrastructure such as that proposed in Xhaul. A first level aggregation node in the transport network may comprise an Optical Line Terminal (OLT) of the passive optical network together with a reconfigurable remote node of the WDM infrastructure. A second level aggregation node in the transport network may comprise a hub node hosting pooled baseband processing resources for the WDM infrastructure. Functioning of the transport network is enabled by methods performed in the first level aggregation nodes of the transport network and in termination nodes of the passive optical network comprised within the transport network. The methods allow for WDM channels originating from a second level aggregation node and transmitted over the WDM infrastructure to be dropped onto a passive optical network for forwarding to an appropriate destination node connected to the passive optical network, bypassing the OLT of the passive optical network and so not interfering with the passive optical channel being transmitted by the OLT to termination nodes on the passive optical network. Such signals may also be passed to destination nodes such as macro cell sites directly connected to the first level aggregation node. The methods also allow for a termination node in the passive optical network (for example an Optical Network Termination (ONT)) to separate out a WDM wavelength corresponding to a channel for a destination node connected to the termination node and to forward that channel to the appropriate destination node. The destination node may for example be a macro/small cell antenna or a RRU. In alternative examples, the ONT may also host the RRU or other termination node, such that the ONT simply drops the separated WDM channels, acting as the destination node for those channels. The methods also allow for implementation of a local wavelength stabilisation loop for a tuneable laser at termination node transmitter, so avoiding the need for complicated communication mechanisms between an OLT (or hub) and an ONT.

Figure 1:
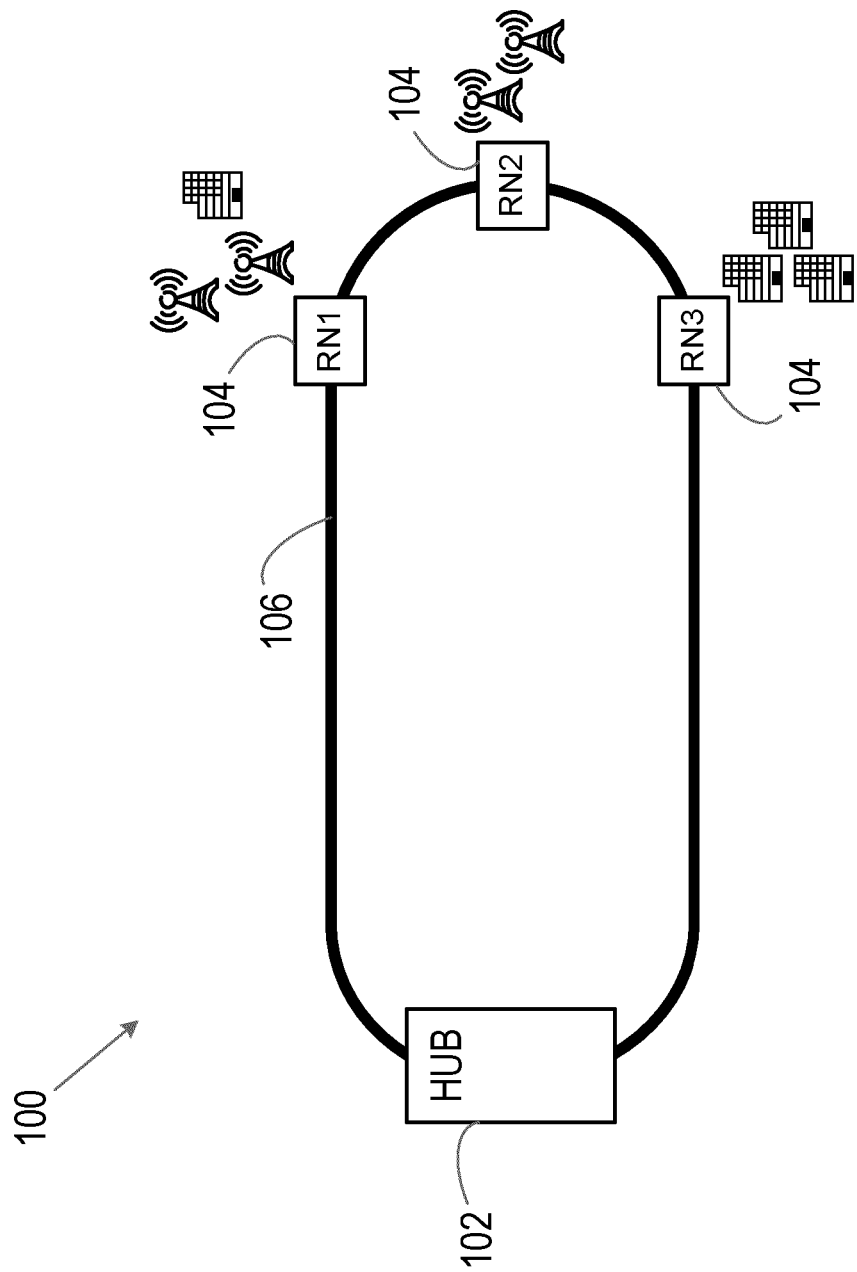
FIG. 1 illustrates a representation of an Xhaul network.
Figure 2:
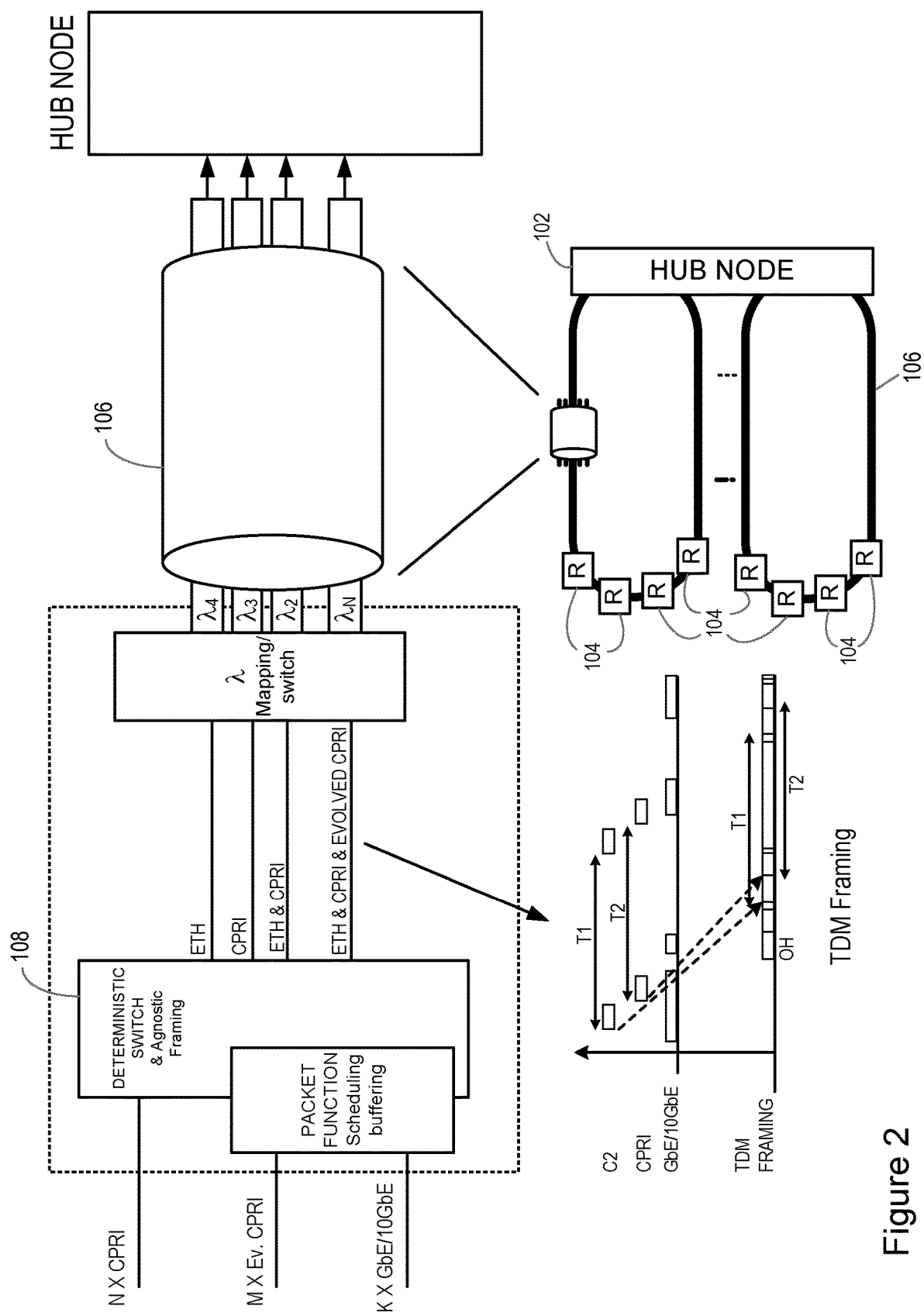
FIG. 2 illustrates additional details of an Xhaul network with respect to FIG. 1.
Figure 3:
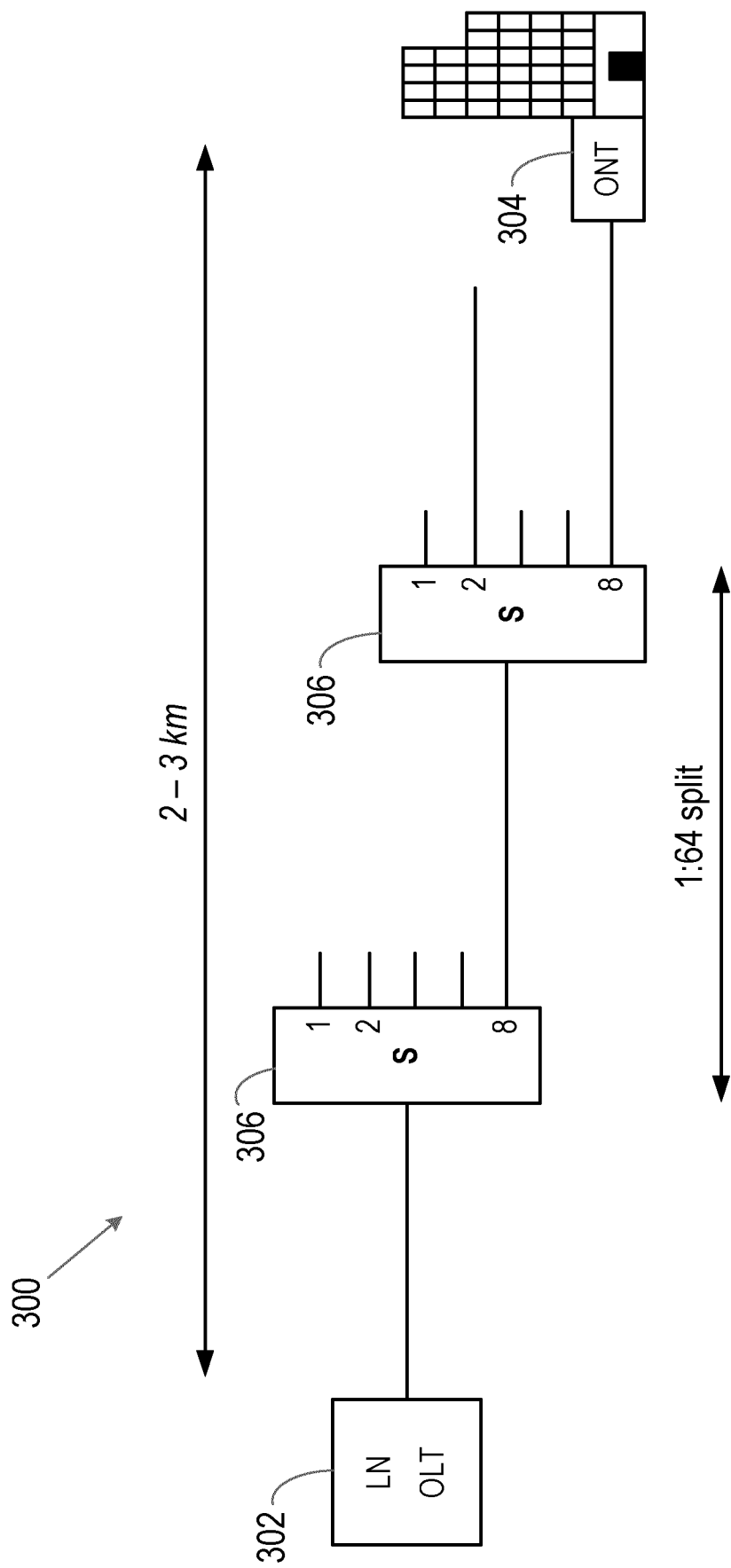
FIG. 3 illustrates a GPON network.
Figure 4:
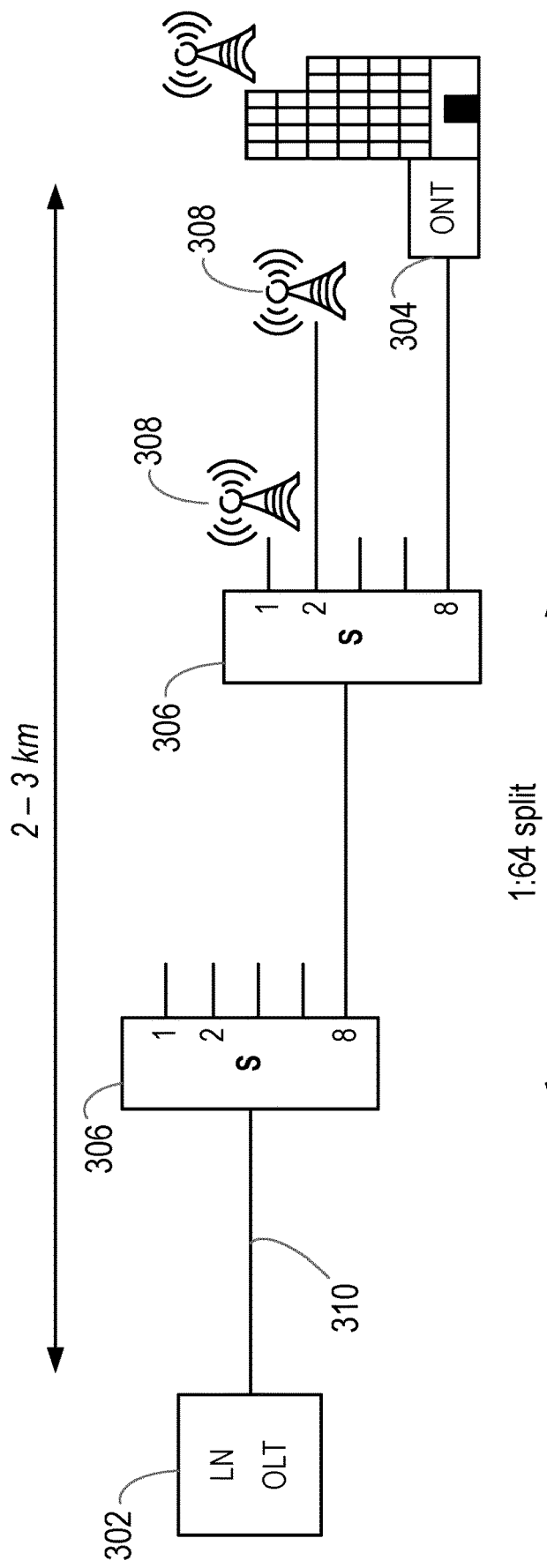
FIG. 4 illustrates a potential alternative use of the GPON network of FIG. 3.
Figure 5:
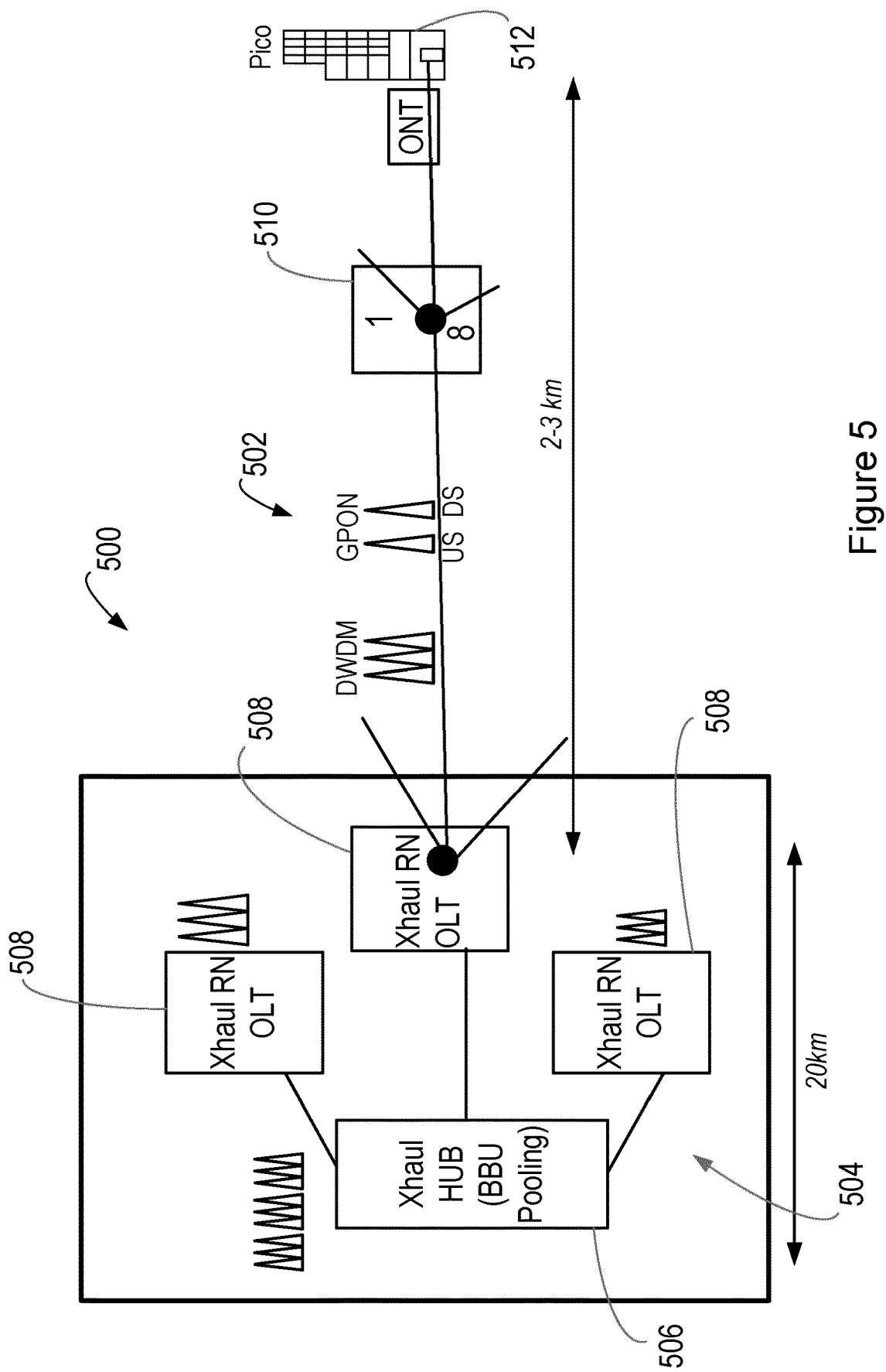
FIG. 5 illustrates a transport network according to an example of the present disclosure.

FIG. 5 illustrates a first example of a transport network 500 according to aspects of the present disclosure. Referring to FIG. 5, the network 500 comprises one or more passive optical networks 502, illustrated in the Figure as one or more GPONs. Only a single branch of a single GPON is illustrated in the Figure for clarity. The network further comprises a WDM infrastructure 504, which in the illustrated example is a DWDM network. The network further comprises a second level aggregation node 506, illustrated as a hub node of an Xhaul network, and a plurality of first level aggregation nodes 508. Each first level aggregation node comprises an OLT of a respective GPON and a reconfigurable remote node of the Xhaul network. First level aggregation nodes 508 may additionally comprise some baseband processing units, allowing for some baseband processing to be conducted in the first level aggregation nodes 508, as may be desirable in certain 5G scenarios. The second level aggregation node 506 comprises pooled BBU resources for the Xhaul network and is connected to the first level aggregation nodes by DWDM network 504, which may comprise a tree or a ring architecture. As discussed above, the GPON 502 comprises one or more passive splitters 510 having branches from 1 to g, and the GPON may comprise multiple layers of passive splitters 510. Connected to branches of the passive splitter 510 there may be one or more termination nodes of the GPON. A single termination node is illustrated in the Figure and is shown as an ONT. The termination nodes may be connected to one or more fixed access premises 512 and/or to one or more RRUs (not shown). Also connected to branches of the passive splitter there may be macro level and/or small cell antenna sites (not shown). Such antenna sites may also be directed connected to a first level aggregation node 508.

Each reconfigurable remote node (hosted in a first level aggregation node as discussed above) may be allocated one or more DWDM channels. The first level aggregation nodes 508 drop wavelengths for the appropriate remote node, and hence for RRUs connected to its GPON, as well as any DWDM channels for macro sites connected to the GPON or directly connected to the first level aggregation node 508. The dropped DWDM channels are sent along the GPON concurrently with the passive optical channels typically used on a GPON. The DWDM and passive optical channels are located on different portions of the spectrum, with the DWDM channels in the C-band, 1525-1565 nm, and the passive optical channels on 1310 nm (upstream) and 1490 nm (downstream).

Figure 6:
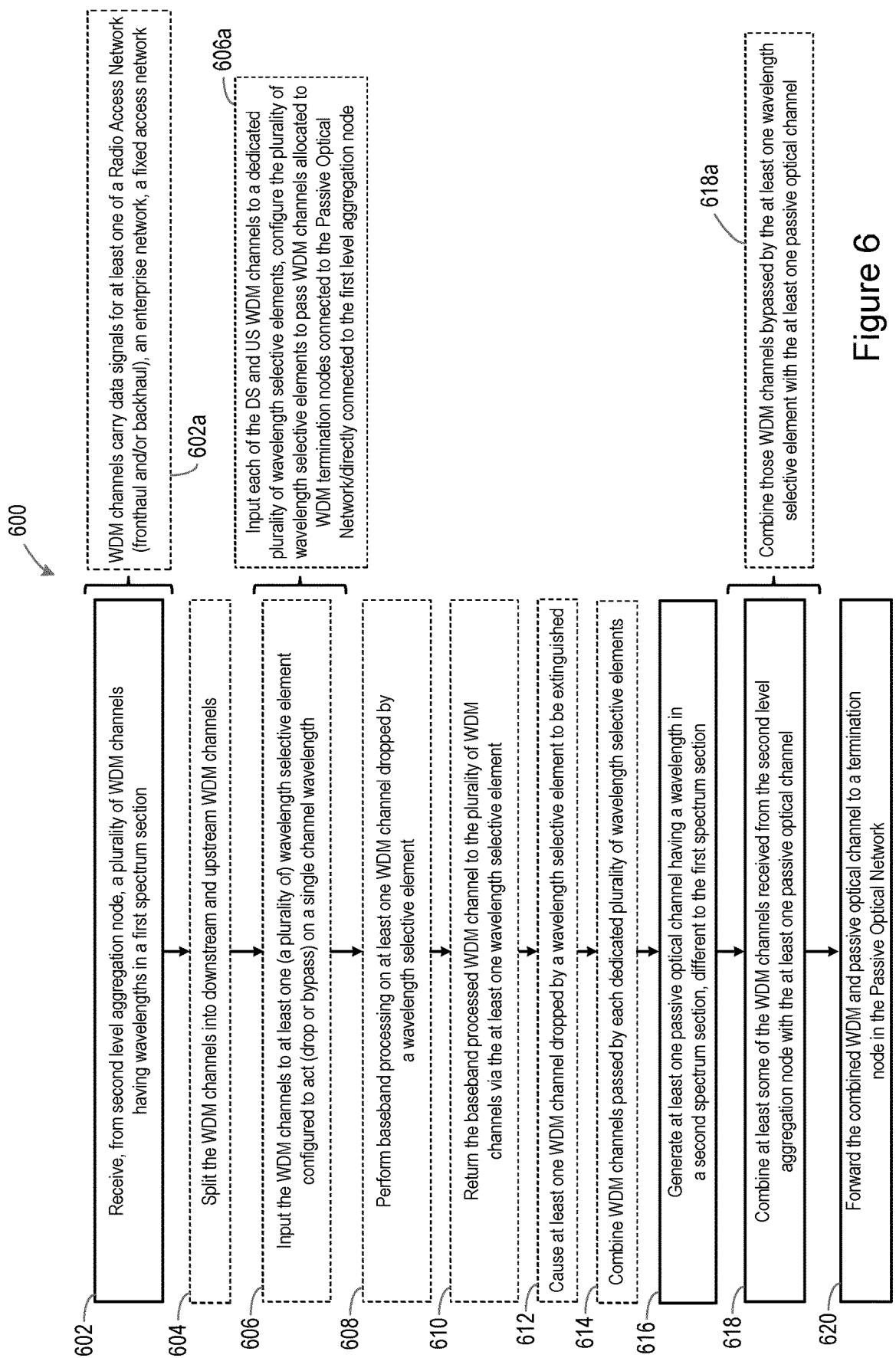
FIG. 6 is a flow chart illustrating process steps in a method in a first level aggregation node of a transport network.

FIG. 6 is a flow chart illustrating process steps in a method 600 in a first level aggregation node of a transport network, the transport network comprising the first level aggregation node, a second level aggregation node and a Passive Optical Network. The passive optical network may for example comprise a GPON. The transport network may comprise a transport network 500 as illustrated in FIG. 5. Referring to FIG. 6, in a first step 602 the method comprises receiving, from the second level aggregation node, a plurality of WDM channels having wavelengths in a first spectrum section. These channels may have stabilised wavelengths and carry data signals for at least one of a Radio Access Network (fronthaul and/or backhaul), an enterprise network and/or a fixed access network, as illustrated at step 602a. The fixed access network may for example be a future implementation of fixed access network. In step 604, the method 600 may comprise splitting the WDM channels into Downstream (DS) and Upstream (US) WDM channels. The method 600 may then comprise inputting the WDM channels received from the second level aggregation node to at least one wavelength selective element, the wavelength selective element configured to act on a single channel wavelength to perform one of dropping the channel wavelength or bypassing the channel wavelength. As noted in FIG. 6, step 606 may comprise inputting the WDM channels to a plurality of wavelength selective elements, each wavelength selective element configured to act on a different single channel wavelength. As illustrated in step 606a, in examples of the method in which DS and US WDM channels have been split, step 606 may be performed by inputting each of the DS and US WDM radio access channels to a dedicated plurality of wavelength selective elements. The method 600 may further comprise configuring the plurality of wavelength selective elements to pass WDM channels allocated to WDM termination nodes connected to the passive optical network and/or directly connected to the first level aggregation node. Examples of wavelength selective elements and their configuration are discussed in further detail below, with reference to FIGS. 10 to 13, and the example first level aggregation nodes illustrated therein.

In some examples of the method 600, the method may further comprise, in step 608, performing baseband processing on at least one WDM channel dropped by a wavelength selective element. This may be performed by local baseband processing resources hosted within the first level aggregation node, as discussed above. The method may then comprise, in step 610, returning the baseband processed WDM channel or channels to the plurality of WDM channels via the plurality of wavelength selective elements, and for example via the wavelength selective element that dropped the channel for local baseband processing. The method 600 may further comprise causing at least one WDM channel dropped by a wavelength selective element to be extinguished in step 612. This may be achieved for example via attenuation and/or tapering. In this manner, channels dropped by the wavelength selective elements may be stopped completely, as opposed to being dropped onto a different waveguide. If the US and DS WDM channels have been input to different pluralities of wavelength selective elements, the method 600 may further comprise combining those WDM channels passed by each dedicated plurality of wavelength selective elements in step 614.

In step 616, the method 600 comprises generating at least one passive optical channel having a wavelength in a second spectrum section, different to the first spectrum section. The passive optical channel may be non-stabilised, and may adopt a Time Division Multiplexing (TDM)/Time Division Multiplexing Access (TDMA) approach. The passive optical channel may for example be a GPON channel generated by the OLT hosted within the first level aggregation node. The passive optical channel may for example carry signals for one or more fixed access communication network subscribers. In step 618, the method 600 comprises combining at least some of the WDM channels received from the second level aggregation node with the at least one passive optical channel. As illustrated in step 618a, this may comprise combining those WDM channels bypassed by the at least one wavelength selective element (or plurality of wavelength selective elements) with the at least one passive optical channel. Finally, in step 620, the method 600 comprises forwarding the combined WDM and passive optical channels to a termination node in the passive optical network.

Examples of the method 600 of FIG. 6 facilitate the operation of a transport network as discussed above by enabling bypass of appropriate WDM channels received from a second level aggregation node without impacting operation of an OLT acting as a generation/termination point for passive optical channels exchanged over an existing GPON.

Figure 7:
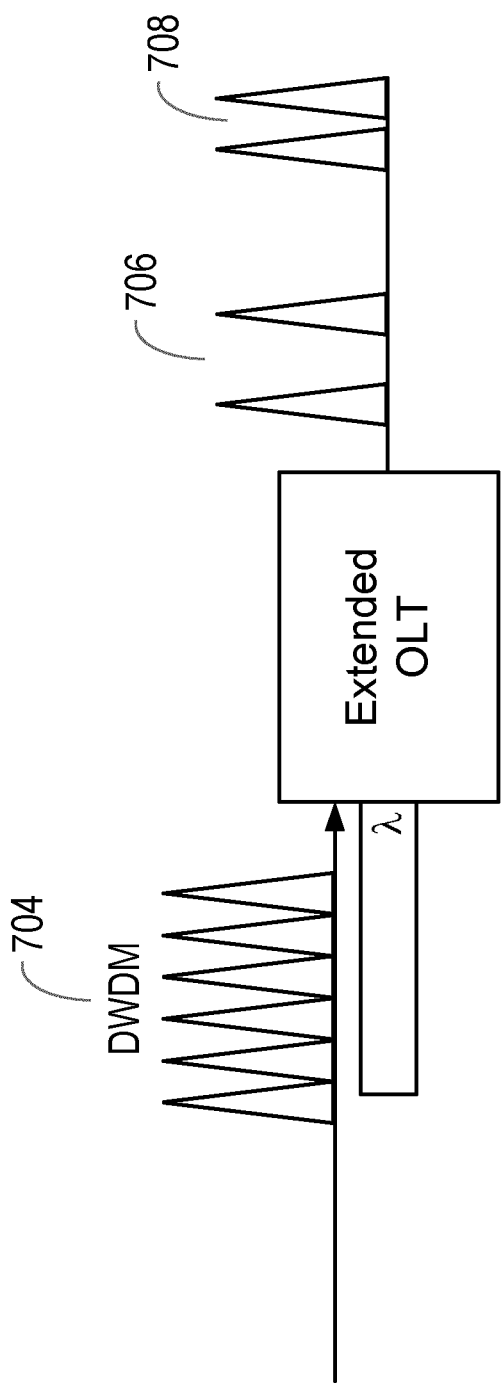
FIG. 7 is illustrates implementation of an example of the method of FIG. 6.

FIG. 7 illustrates the effect of implementing an example of the method 600. The implementation, illustrated in the Figure as "Extended OLT", illustrates a series of incoming DWDM channels 704 to the first level aggregation node. Within the extended OLT implementation of the method 600, the DWDM channels are input to a plurality of wavelength selective elements, and certain of the channels are extinguished while others 708 are passed through to the be combined with US and DS passive optical channels 706 and forwarded onto the GPON.

Figure 8:
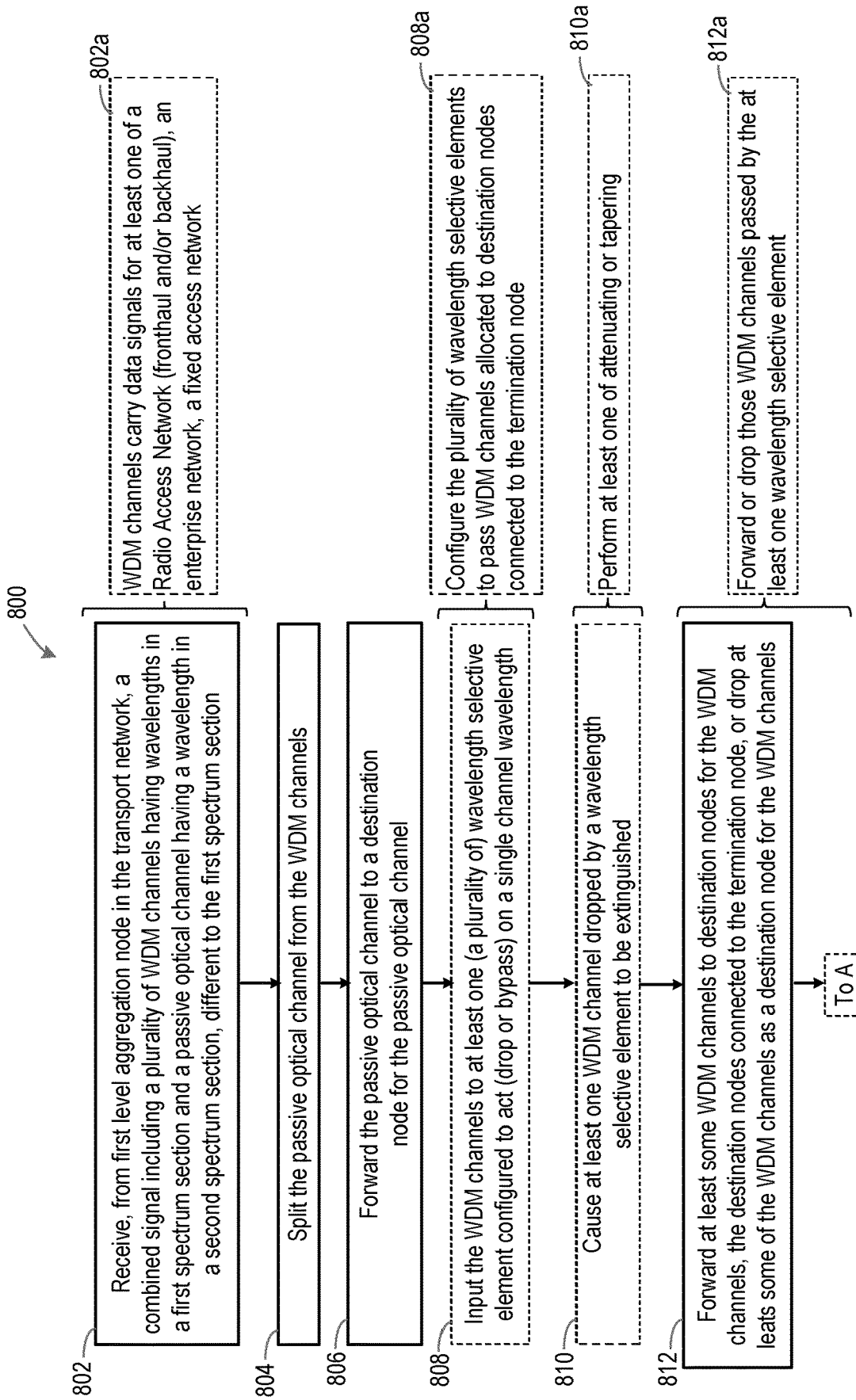
FIG. 8 is a flow chart illustrating process steps in a method in a termination node of a transport network.

The method 600 may be complemented by a method 800 conducted in a termination node of a transport network as illustrated in FIG. 8, the transport network comprising a first level aggregation node, a second level aggregation node and a Passive Optical Network. The passive optical network may for example be a GPON. The transport network may comprise a transport network 500 as illustrated in FIG. 5. The termination node may be a termination node of the passive optical network, and may for example be an ONT, as illustrated in FIG. 5. Referring to FIG. 8, the method 800 comprises, in a first step 802, receiving, from the first level aggregation node in the transport network, a combined signal including a plurality of WDM channels having wavelengths in a first spectrum section and a passive optical channel having a wavelength in a second spectrum section, different to the first spectrum section. The WDM channels may carry data signals for at least one of a Radio Access Network (fronthaul and/or backhaul), an enterprise network and/or a fixed access network, as illustrated at step 802a. The passive optical channel or channels may carry data signals for one or more fixed access communication network subscribers. The fronthaul signals of any example may be considered as carrying radio data between a BBU and RRU, i.e. for transmission by the RRU or for baseband processing by the BBU. The radio data may use a connection orientated protocol or a packet switched protocol. The radio data may be considered as a digital radio frequency signal or an analogue radio frequency signal. The fronthaul signals are carried on the optical WDM channels, as described. The backhaul data may be considered as data which has been baseband processed at a termination node (i.e. radio base station) before transmission over the transport network described, or will be baseband processed at a termination node (i.e. radio base station) when transmitted over the transport network. The WDM channels may carry radio access network data for any type of radio access network, e.g. LTE, LTE Evolution, LTE Advanced and/or New Radio (5G). The data may be any combination of fronthaul and/or backhaul data.

The method 800 then comprises splitting the passive optical channel from the WDM channels in step 804 and forwarding the passive optical channel to a destination node for the passive optical channel in step 806. The destination node may for example be located at a fixed access subscriber premises. The method 800 may then comprise, in step 808, inputting the WDM channels to at least one wavelength selective element, the wavelength selective element configured to act on a single channel wavelength to perform one of dropping the channel wavelength or bypassing the channel wavelength. As illustrated in FIG. 8, step 808 may comprise inputting the WDM channels to a plurality of wavelength selective elements, each wavelength selective element configured to act on a different wavelength. Examples of wavelength selective elements are discussed below with reference to FIGS. 10 to 13. The method 800 may further comprise, as illustrated at step 808a, configuring the plurality of wavelength selective elements to pass WDM channels allocated to destination nodes connected to the termination node. The destination nodes may for example be RRUs and/or macro cells and/or small cells. The method may further comprise receiving a control signal indicating WDM channels allocated to destination nodes connected to the termination node.

In step 810, the method 800 may comprise causing at least one WDM channel dropped by a wavelength selective element to be extinguished. As illustrated at step 810a, this may be achieved by performing at least one of attenuating and/or tapering. The method 800 then comprises forwarding at least some WDM channels to destination nodes for the WDM channels, the destination nodes connected to the termination node, or dropping at least some of the WDM channels as a destination node for the WDM channels, in step 812. As illustrated in step 812a, this may comprise forwarding or dropping those WDM channels passed by the at least one wavelength selective element or plurality of wavelength selective elements.

Examples of the method 800 thus enable a termination node in a transport network according to examples of the present disclosure to handle multiple channels in different spectrum portions. Such channels may include for example radio access and fixed access channels.

Figure 9:
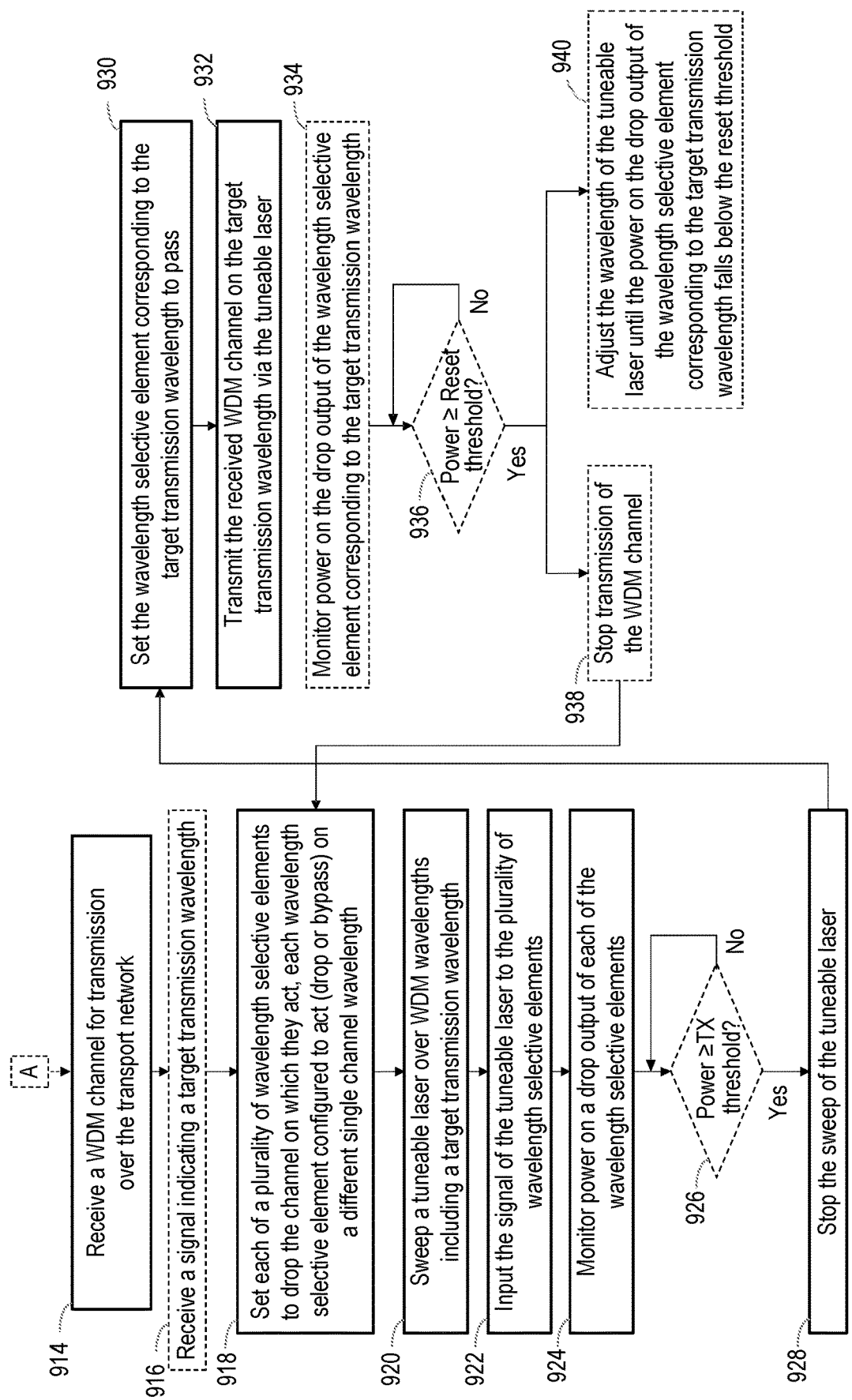
FIG. 9 is a flow chart illustrating process steps in another example of method in a termination node of a transport network.

The methods 600 and 800 may be complemented by a method 900 for transmitting a radio access channel over a transport network, as illustrated in FIG. 9. The method 900 is also conducted at a termination node of the transport network, and may be considered as a continuation of the method 800. The steps of the method 900 may be conducted by the termination node before, after or concurrently with the steps of the method 800.

Referring to FIG. 9, the method 900 comprises, in a first step 914, receiving a WDM channel for transmission over the transport network. The method may further comprise, in step 916, receiving a signal indicating a target transmission wavelength to be used by the termination node. In step 918, the method 900 comprises setting each of a plurality of wavelength selective elements to drop the channel on which they act, each wavelength selective element configured to act on a different single channel wavelength to perform one of dropping the channel wavelength or bypassing the channel wavelength. The method 900 further comprises, in step 920, sweeping a tuneable laser over WDM wavelengths including the target transmission wavelength, and in step 922, inputting the signal of the tuneable laser to the plurality of wavelength selective elements. In step 924, the method 900 comprises monitoring power on a drop output of each of the wavelength selective elements. In step 926, an assessment is made as to whether or not the power on the drop output of the wavelength selective element corresponding to the target transmission wavelength has reached a transmission threshold. Once the power on the drop output corresponding to the target transmission wavelength has reached the transmission threshold, the method 900 comprises stopping the sweep of the tuneable laser in step 928 and setting the wavelength selective element corresponding to the target transmission wavelength to bypass in step 930. In step 932, the method 900 comprises transmitting the received WDM channel on the target transmission wavelength via the tuneable laser. The WDM channel may be transmitted to a first level aggregation node in the transport network.

Examples of the method 900 thus avoid remote feedback for laser wavelength tuning and stabilisation and also avoid cross-talk issues during the tuning phase, when the sweeping wavelength could collide with traffic channels.

Referring again to FIG. 9, the method 900 may further comprise monitoring power on the drop output of the wavelength selective element corresponding to the target transmission wavelength in step 934 and determining in step 936 whether the power on the drop output of the wavelength selective element corresponding to the target transmission wavelength has reached a reset threshold, which may be lower than the transmission threshold. If the power on the drop output of the wavelength selective element corresponding to the target transmission wavelength reaches a reset threshold, the method 900 may comprise stopping transmission of the WDM channel in step 938 and returning to step 918: resetting the wavelength selective element corresponding to the target transmission wavelength to drop the channel on which it acts and restarting sweep of the tuneable laser. Alternatively, the method 900 may comprise, in step 940, adjusting the wavelength of the tuneable laser until the power on the drop output of the wavelength selective element corresponding to the target transmission wavelength falls below the reset threshold. In this manner, during regular system operation, when nominally no power should be detected on the drop output of the wavelength selective element configured to act on the transmission wavelength, if power higher than a reset threshold is detected, appropriate action may be taken to reset the tuneable laser to the target transmission wavelength.

Figure 10:
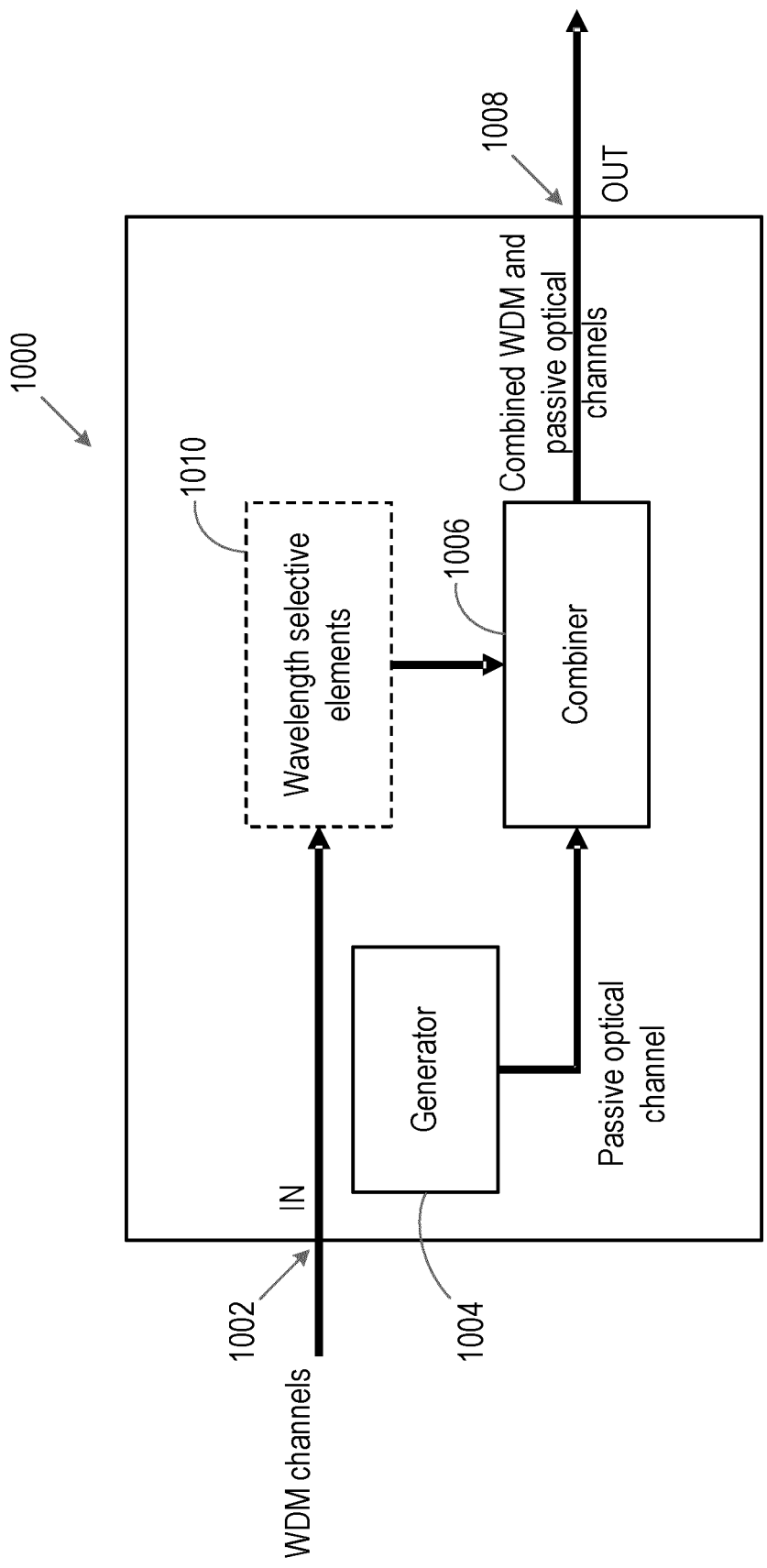
FIG. 10 is a block diagram illustrating functional units in a first level aggregation node of a transport network.

FIG. 10 is a block diagram illustrating functional elements in an example of a first level aggregation node 1000 in a transport network, such as the transport network 500 of FIG. 5. The node may be adapted or configured to carry out examples of the method 600. Referring to FIG. 10, the node 1000 comprises an input 1002 for receiving, from a second level aggregation node in the transport network, a plurality of WDM channels having wavelengths in a first spectrum section. The node also comprises a generator for generating at least one passive optical channel having a wavelength in a second spectrum section, different to the first spectrum section, and a combiner for combining at least some of the WDM channels received from the second level aggregation node with the at least one passive optical channel. The node 1000 also comprises an output 1008 for forwarding the combined WDM and passive optical channel to a termination node in the Passive Optical Network of the transport network. The node 1000 may further comprise at least one wavelength selective element, the wavelength selective element configured to act on a single channel wavelength to perform one of dropping the channel wavelength or bypassing the channel wavelength. The node may comprise a plurality of wavelength selective elements 1010, each wavelength selective element configured to act on a different single channel wavelength. The combiner 1006 may be configured to combine those WDM channels bypassed by the wavelength selective elements with the at least one passive optical channel.

Figure 11:
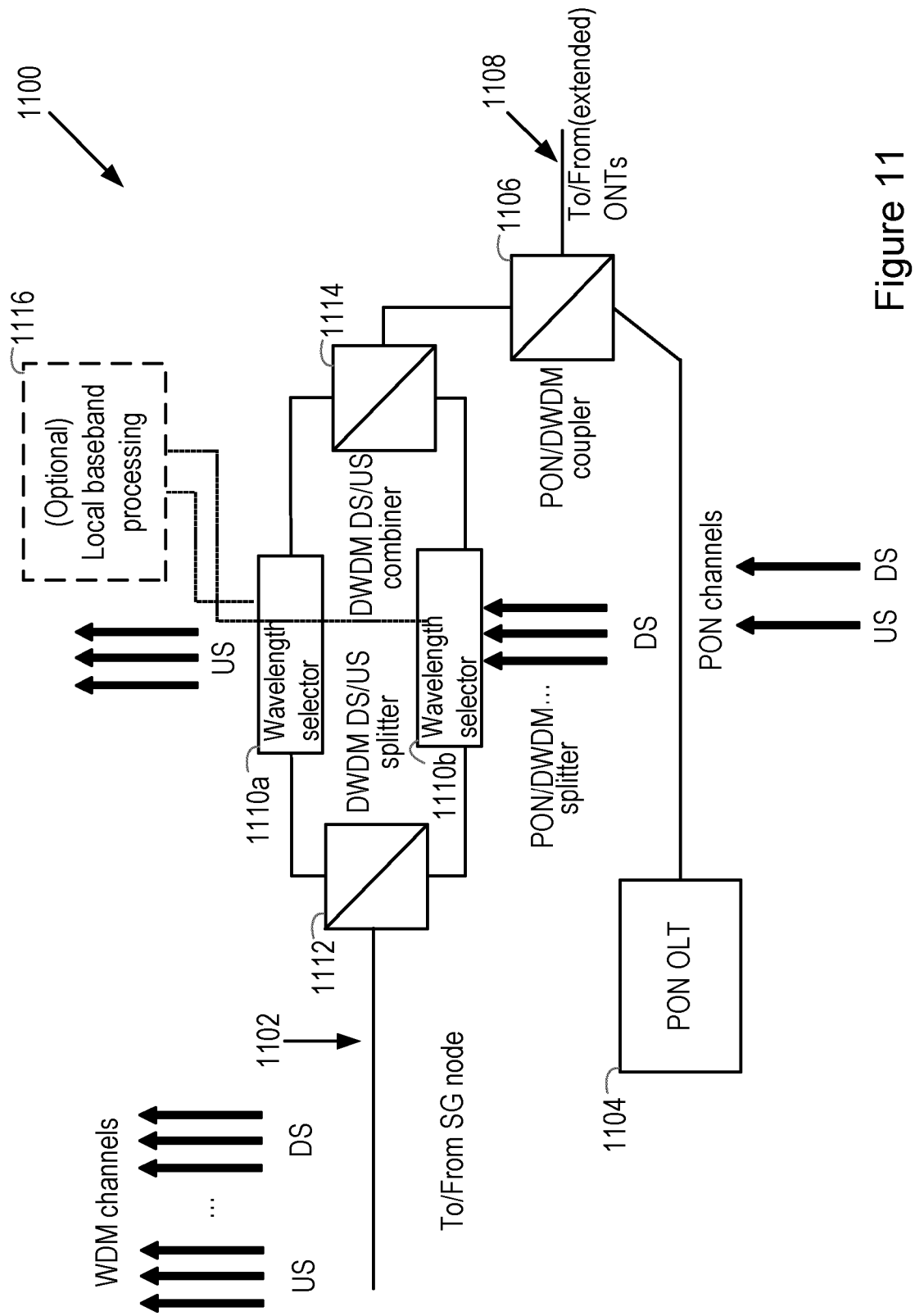
FIG. 11 is a block diagram illustrating functional units in another example of first level aggregation node of a transport network.

FIG. 11 illustrates functional elements in another example of first level aggregation node 1100 in a transport network, which may be a transport network as discussed above according to examples of the present disclosure. Referring to FIG. 11, the node 1100 comprises an input 1102 for receiving, from a second level aggregation node in the transport network, a plurality of WDM channels having wavelengths in a first spectrum section. The node 1100 also comprises a splitter 1112 for splitting the WDM channels into downstream and upstream WDM radio access channels. The node 1100 further comprises a plurality of wavelength selective elements 1110, each wavelength selective element configured to act on a WDM channel of a different single wavelength. The plurality of wavelength selective elements comprises a first plurality of wavelength selective elements 1110*a* for upstream WDM channels and a second plurality of wavelength selective elements 1110*b* for downstream WDM channels.

The node 1100 further comprises a combiner 1114 for combining WDM channels bypassed by each dedicated plurality of wavelength selective elements 1110*a*, 1110*b*, and a combiner 1106 for combining WDM radio access channels bypassed by the plurality of wavelength selective elements with at least one passive optical channel. The node 1100 also comprises an Optical Line Terminal 1104 of the passive optical network in the transport network for generating the passive optical channel. The node 1100 further comprises an output 1108 for forwarding the combined WDM and passive optical channels to a termination node in the passive optical network. The node 1100 may also comprise a baseband processing unit 1116 for performing baseband processing on at least one WDM channel dropped by a wavelength selective element.

Figure 12:
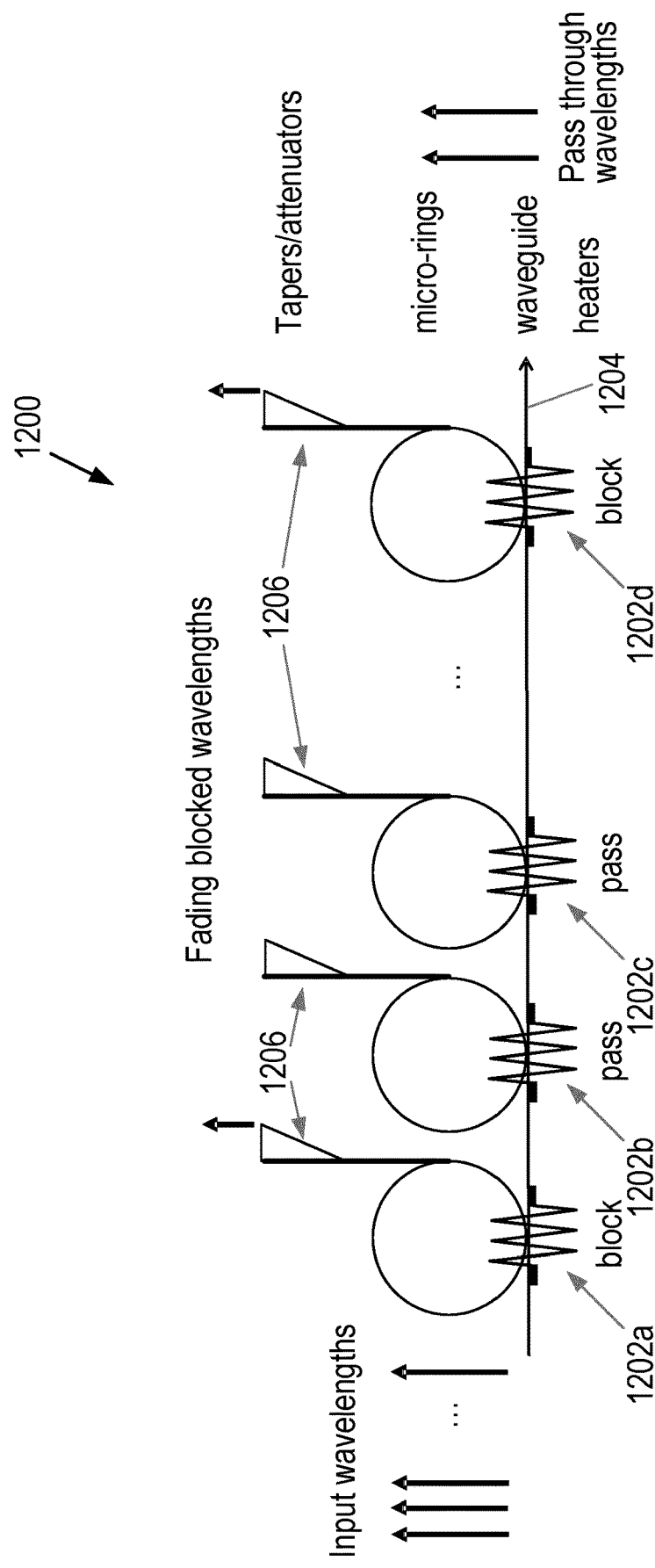
FIG. 12 is a representation of an example of wavelength selective elements which may be included in the node of FIG. 11.

FIG. 12 illustrates in greater detail a first example of a plurality of wavelength selective elements 1200, such as may be included in the node 1000 or 1100. Referring to FIG. 12, the plurality of wavelength selective elements comprises a plurality of thermally tuned micro-ring resonators 1202 coupled to a single waveguide 1204. The micro-ring resonators 1202 selectively extract a specific optical channel, or wavelength, from the waveguide 1204 and redirect that optical channel or wavelength towards a drop port of the micro-ring resonator, while allowing bypass of all other optical channels or wavelengths. Each micro-ring resonator 1202 is set or tuned to act upon a particular optical wavelength from the combination of optical channels input along the waveguide 1204. Each micro ring resonator may be set to bypass its specific wavelength, allowing light on that wavelength to continue along the waveguide with the other optical channels input to the waveguide, or to drop its specific wavelength, transferring light on that wavelength to a drop port of the micro-ring resonator such that the light is blocked from continuing along the waveguide 1204. In the present example, the micro-ring resonators are tuned by heating (or cooling) each micro-ring resonator to vary the refractive index associated with the material from which the micro-ring resonator is made. Similar tuning may be accomplished by varying an electric field applied across the micro-ring resonator.

As illustrated in FIG. 12, in the context of a plurality of wavelength selective elements in a node 1000 or 1100, a plurality of WDM channels is input to the waveguide 1204 and so input sequentially to the plurality of micro-ring resonators. In the illustrated example, the first and last micro-ring resonators 1202*a*, 1202*d* have been set to block their particular wavelengths, with the intermediate micro-ring resonators 1202*b*, 1202*c*, set to bypass their particular wavelengths. All of the channels input to the waveguide 1204 enter the first micro-ring resonator 1202*a* and light associated with the single, predetermined optical channel or wavelength for which the first micro-ring resonator is tuned is transferred from the first micro-ring resonator 1202*a* to a drop port of the first micro-ring resonator 1202*a*. The remaining channels continue along the waveguide 1204 and enter the second micro-ring resonator 1202*b*. This micro-ring resonator is set to allow the wavelength on which it is to act to pass, and so all channels exit the second micro-ring resonator and enter the third micro-ring resonator 1202*c*. This micro-ring is also set to allow the wavelength on which it is to act to pass, and so all channels exit the third micro-ring resonator and continue, until the remaining channels enter the final micro-ring resonator 1202*d*. The final micro-ring resonator 1202*d* is set to block its associated wavelength, and so light on that wavelength is directed to a drop port of the final micro-ring resonator 12022. The result of the combined action of the micro-ring resonators 1202 is that at the exit of the waveguide, only the channels associated with the second and third micro-ring resonators, which were set to bypass, are still present. These channels may be combined with one or more passive optical channels for forwarding, as discussed above.

The drop ports of the micro-ring resonators are equipped with tapers or attenuators 1206, which cause the dropped channels to be extinguished, rather than being directed elsewhere. The dropped channels are thus effectively stopped or blocked, with only the bypassed channels continuing along the waveguide for further transport or processing. It will be appreciated that the plurality of wavelength selective elements 1200 illustrated in FIG. 12 is effectively "colourless", meaning that the wavelengths can be configured arbitrarily, and may be reconfigured for example in the event of changes to the allocation of wavelengths to particular nodes. This simplifies inventory issues, reduces the number of spare parts and ensures that the elements are highly adaptable, supporting the possibility of reconfiguring a transport network to accommodate infrastructure changes, upgrades or varying requirements. Compared to tuneable filters, the plurality of wavelength selective elements 1200 illustrated in FIG. 12 may be implemented in a very cost effective way, as it is easier to design individual micro-ring resonators resonant on a single wavelength (or having a limited tuning range) than to design tuneable filters capable of selecting any wavelength in the C-band.

Figure 13:
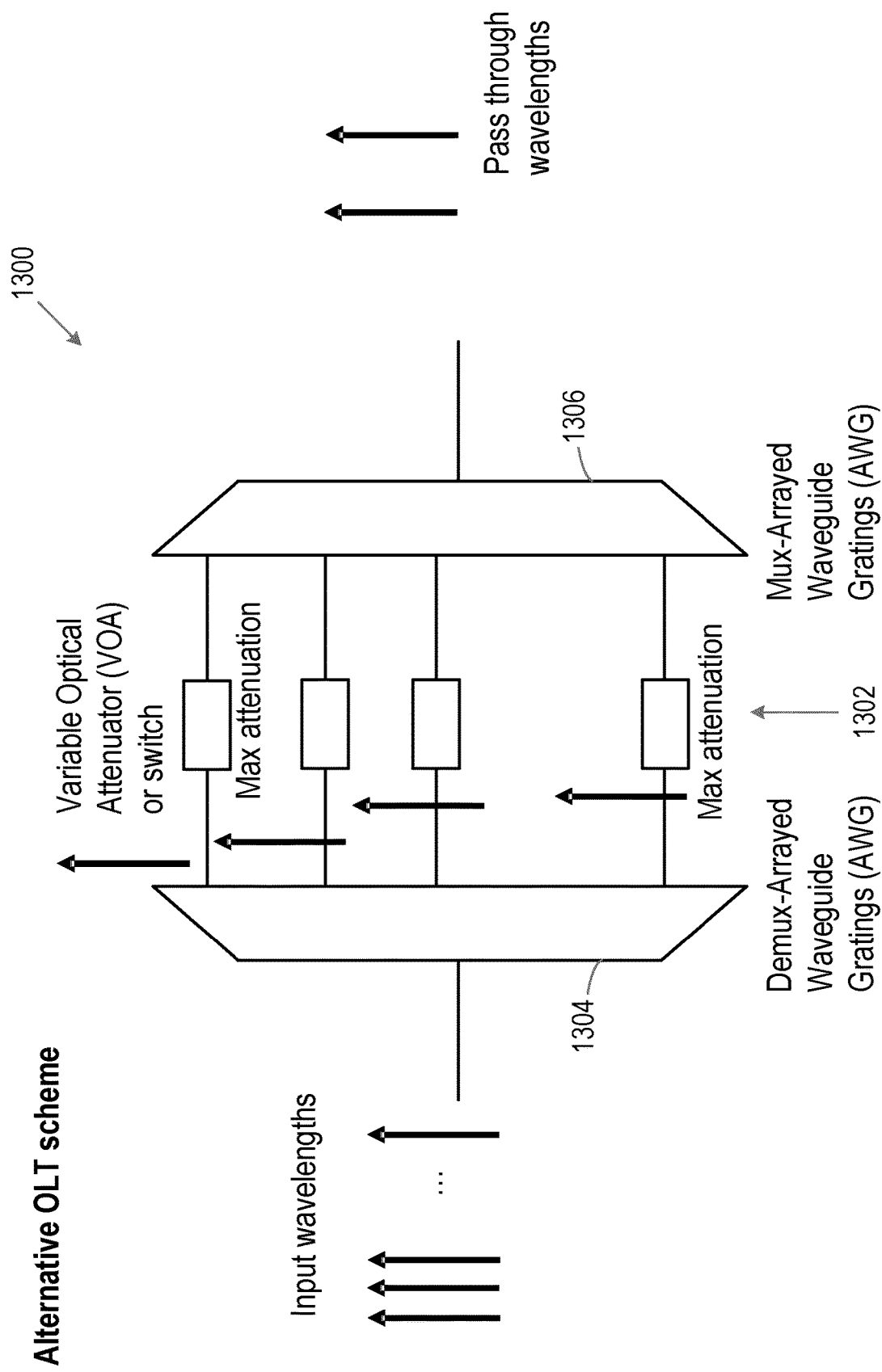
FIG. 13 a representation of another example of wavelength selective elements which may be included in the node of FIG. 11.

FIG. 13 illustrates in greater detail another example of a plurality of wavelength selective elements 1300, such as may be included in the node 1000 or 1100. Referring to FIG. 13, the plurality of wavelength selective elements comprises a plurality of optical attenuators or switches 1302, each attenuator or switch coupled to an output port of an optical demultiplexer 1304 and an input port of an optical multiplexer 1306. The optical demultiplexer 1304 and multiplexer 1306 comprise Arrayed Waveguide Gratings (AWGs). Each switch or attenuator 1302 may be set to bypass or to block the channel on which it acts, such that bypassed channels are combined in the multiplexer 1306 and forwarded for further processing or transport, and blocked channels are extinguished.

Figure 14:
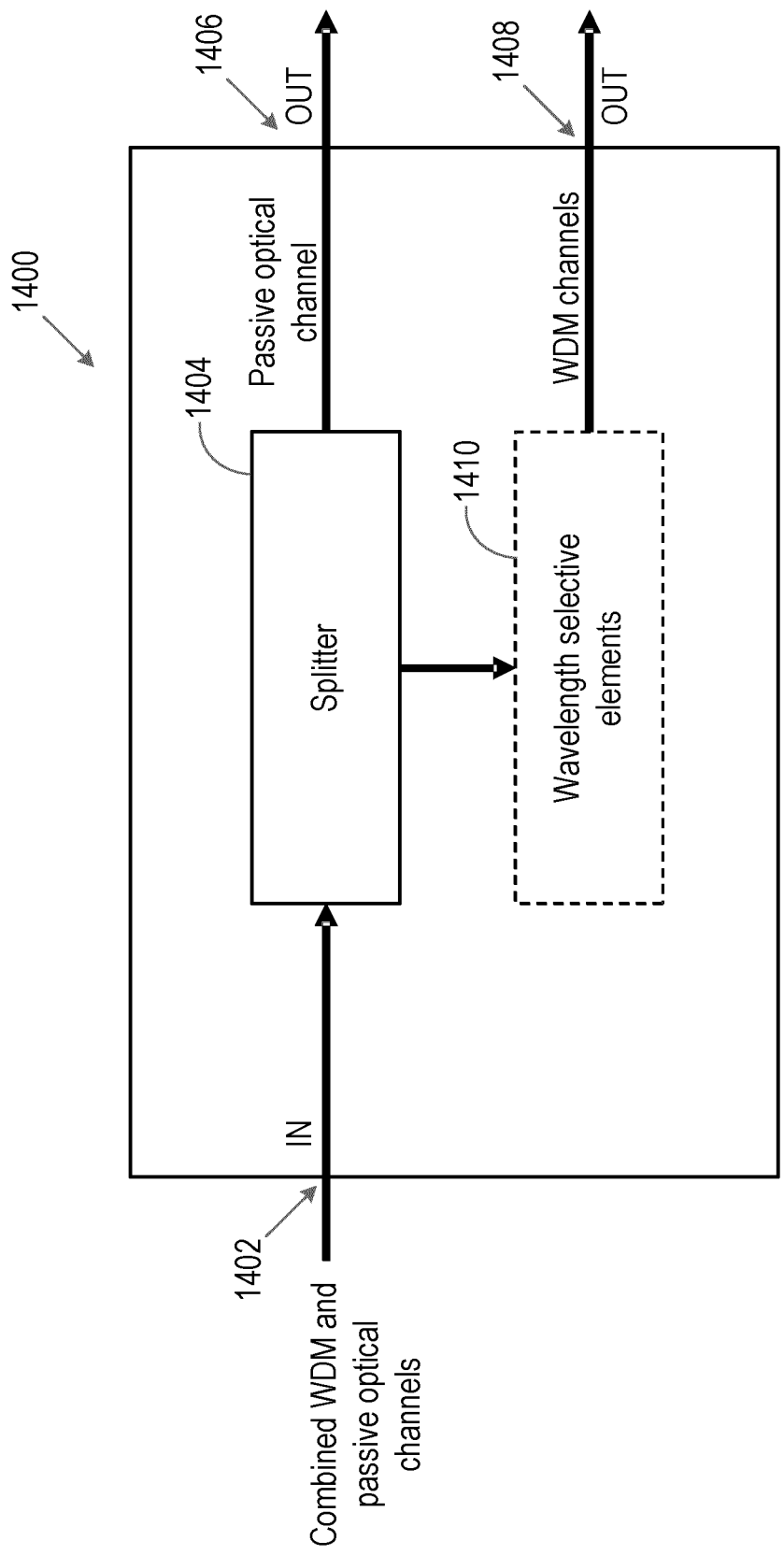
FIG. 14 is a block diagram illustrating functional units in a termination node of a transport network.

FIG. 14 is a block diagram illustrating functional elements in an example of a termination node 1400 in a transport network, such as the transport network 500 of FIG. 5. The node 1400 may be a termination node of the passive optical network, and may for example be an ONT. The node 1400 may be adapted or configured to carry out examples of the method 800. Referring to FIG. 14, the node 1400 comprises an input 1402 for receiving, from a first level aggregation node in the transport network, a combined signal including a plurality of WDM channels having wavelengths in a first spectrum section and a passive optical channel having a wavelength in a second spectrum section, different to the first spectrum section. The node 1400 further comprises a splitter 1404 for splitting the passive optical channel from the WDM channels and a first output 1406 for forwarding the passive optical channel to a destination node for the passive optical channel. The destination node may for example be a located at a premises of a fixed access communication network subscriber. The node 1400 further comprises a second output 1408 for forwarding at least some of the WDM channels to destination nodes for the WDM channels or for dropping at least some of the WDM channels as a destination node for the WDM channels. The destination nodes may for example be RRUs and/or macro cells and/or small cells. The node 1400 may further comprise at least one wavelength selective element, the wavelength selective element configured to act on a single channel wavelength to perform one of dropping the channel wavelength or bypassing the channel wavelength. The node may comprise a plurality of wavelength selective elements 1410, each wavelength selective element configured to act on a different single channel wavelength. The second output may be for forwarding or dropping those WDM channels bypassed by the at least one or plurality of wavelength selective elements to destination nodes for those WDM channels. The plurality of wavelength selective elements may comprise a plurality of micro-ring resonators 1200 as illustrated in FIG. 12 and/or a plurality of attenuators or switches 1300 as illustrated in FIG. 13.

Figure 15:
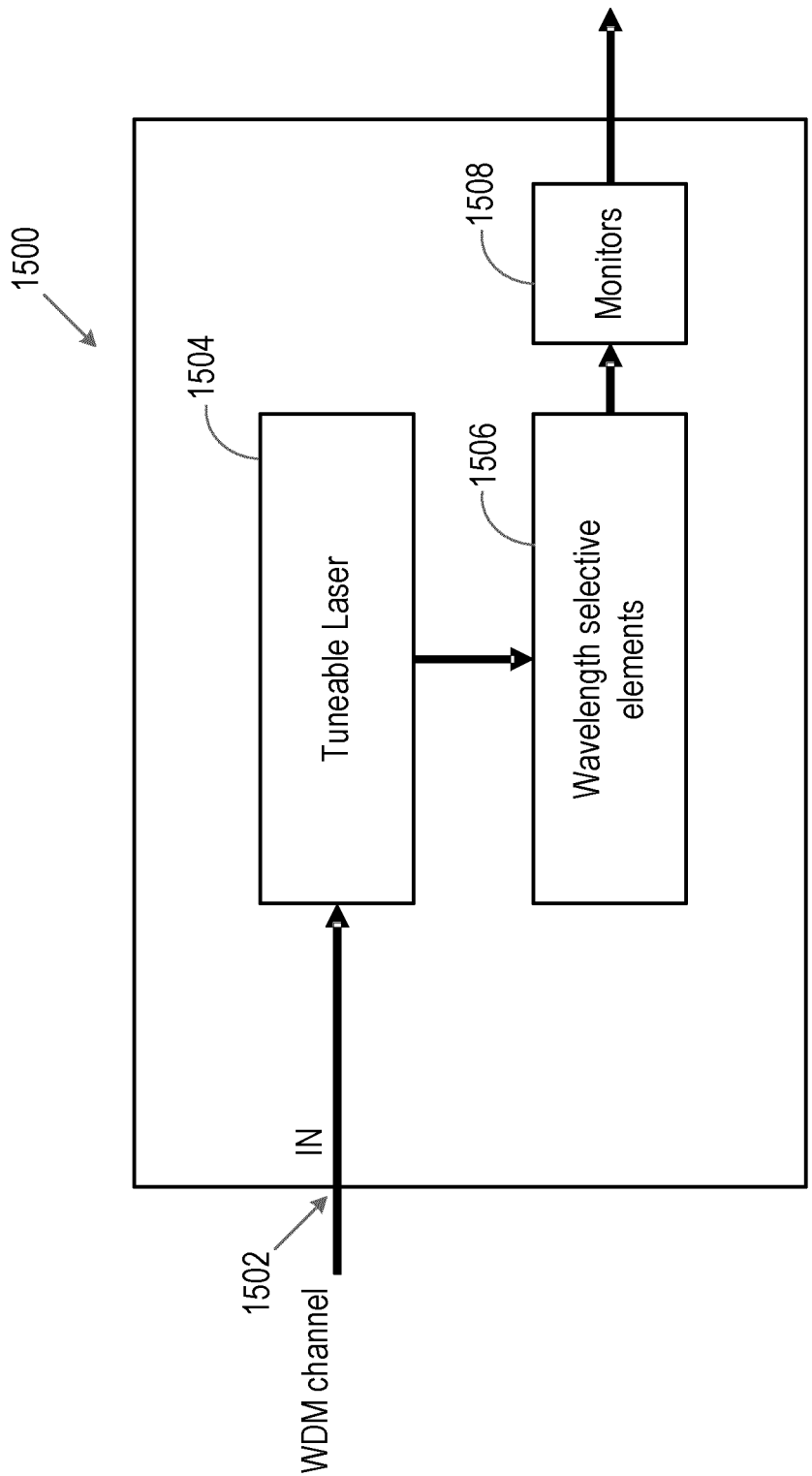
FIG. 15 is a block diagram illustrating functional units in another example of a termination node of a transport network.

FIG. 15 is a block diagram illustrating functional units in another example of a termination node 1500 in a transport network such as the transport network 500 of FIG. 5. The node 1500 may be a termination node of the passive optical network, and may for example be an ONT. The node 1500 may be adapted or configured to carry out examples of the method 900. Referring to FIG. 15, the node 1500 comprises an input 1502 for receiving a WDM channel for transmission over the transport network and a tuneable laser 1504 for sweeping over WDM wavelengths including a target transmission wavelength. The node 1500 further comprises a plurality of wavelength selective elements 1506, each wavelength selective element acting on a WDM channel of a single wavelength, and a plurality of monitors 1508 for monitoring power on a drop output of each of the wavelength selective elements. The functional units of the termination node 1500 may be included in the termination node 1400.

FIG. 16 illustrates another example of a first level aggregation node 1600 in a transport network, which may be a transport network as discussed above according to examples of the present disclosure. The node 1600 may be configured to carry out examples of the method 600, for example on receipt of suitable instructions from a computer program. Referring to FIG. 16, the node 1600 comprises a processor 1602, a memory 1604 and interfaces 1606. The memory 1604 contains instructions executable by the processor 1602 such that the node 1600 is operative to conduct some or all of the steps of the method 600.

FIG. 17 illustrates another example of a termination node 1700 in a transport network such as the transport network 500 of FIG. 5. The node 1700 may be a termination node of the passive optical network, and may for example be an ONT. The node 1700 may implement examples of the method 800, for example on receipt of suitable instructions from a computer program. Referring to FIG. 17, the node 1700 comprises a processor 1702, a memory 1704 and interfaces 1706. The memory 1704 contains instructions executable by the processor 1702 such that the node 1700 is operative to conduct some or all of the steps of the method 800.

FIG. 18 illustrates another example of a termination node 1800 in a transport network such as the transport network 500 of FIG. 5. The node 1800 may be a termination node of the passive optical network, and may for example be an ONT. The node 1800 may implement examples of the method 900, for example on receipt of suitable instructions from a computer program. Referring to FIG. 18, the node 1800 comprises a processor 1802, a memory 1804 and interfaces 1806. The memory 1804 contains instructions executable by the processor 1802 such that the node 1800 is operative to conduct some or all of the steps of the method 900.

Figure 19:
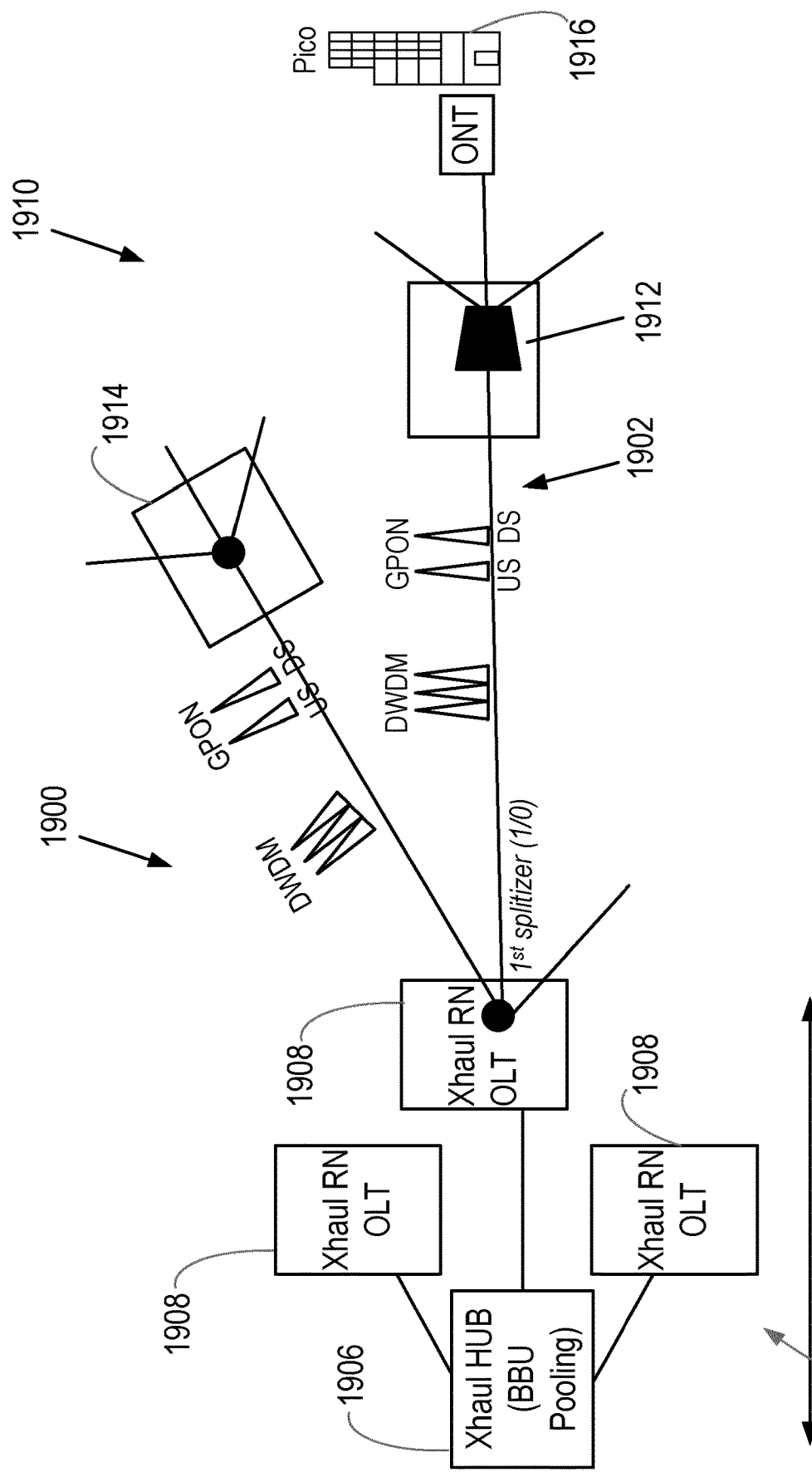
FIG. 19 illustrates another example of transport network according to an example of the present disclosure.

FIG. 19 illustrates another example of a transport network 1900 according to aspects of the present disclosure. Referring to FIG. 19, the network 1900 comprises one or more passive optical networks 1902, illustrated in the Figure as one or more GPONs. The network further comprises a WDM infrastructure 1904, which in the illustrated example is a DWDM network. The network further comprises a second level aggregation node 1906, illustrated as a hub node of an Xhaul network, and a plurality of first level aggregation nodes 1908. Each first level aggregation node comprises an OLT of a respective GPON and a reconfigurable remote node of the Xhaul network. First level aggregation nodes 1908 may additionally comprise some baseband processing units, allowing for some baseband processing to be conducted in the first level aggregation nodes 1908, as may be desirable in certain 5G scenarios. The second level aggregation node 1906 comprises pooled BBU resources for the Xhaul network and is connected to the first level aggregation nodes by DWDM network 1904, which may comprise a tree or a ring architecture. In the GPON 1902, a passive optical splitter is replaced by a DWDM mux/demux, for example a passive cyclic Arrayed Wave Grating (AWG) 1912. The network 1900 may comprise multiple GPONs, including GPONs in which a last splitter is replaced with a DWDM mux/demux, such as the GPON 1902, and GPONs in which this is not the case, such as the GPON illustrated at 1910. Connected to branches of the passive splitter 1914 or AWG 1912 there may be one or more termination nodes of the GPON. The termination nodes may be connected to one or more fixed access premises 1916 and/or to one or more RRUs (not shown). Also connected to branches of the passive splitter or AWG there may be macro level and/or small cell antenna sites (not shown). Such antenna sites may also be directed connected to a first level aggregation node 1908.

As in the example network 500 of FIG. 5, each reconfigurable remote node (hosted in a first level aggregation node as discussed above) may be allocated one or more DWDM channels. The first level aggregation nodes 1908, which may be nodes 1000, 1100, 1600 as discussed above, drop wavelengths for the appropriate remote node, and hence for RRUs connected to its GPON, as well as any DWDM channels for macro sites connected to the GPON or directly connected to the first level aggregation node 1908. This may be achieved using examples of the method 600 discussed above. The dropped DWDM channels are sent along the GPON concurrently with the passive optical channels typically used on a GPON. The DWDM and passive optical channels are located on different portions of the spectrum, with the DWDM channels in the C-band, 1525-1565 nm, and the passive optical channels on 1310 nm (upstream) and 1490 nm (downstream). In a GPON such as GPON 1910, in which the passive splitter has not been replaced by an AWG, the GPON termination node may be a termination node such as the node 1400 or 1700 discussed above, and may perform examples of the method 800 discussed above to separate the passive optical and WDM channels, and direct the various channels to the correct destination. In a GPON such as the GPON 1902, in which the passive splitter has been replaced by an AWG, the AWG may select the specific WDM wavelength for each drop fiber, with the termination node of the GPON (illustrated as an ONT), handling only the passive optical GPON channels.

Aspects of the present disclosure thus provide a transport network over which both WDM channels, such as those used for CRAN, and passive optical channels, such as those used for fixed access based on GPON infrastructure, may be commonly transported. WDM channels, such as DWDM channels, may be assigned to antenna sites in the CRAN, and may coexist with standard upstream and downstream GPON channels. Functioning of the transport network is facilitated by methods performed at first and second level aggregation nodes and at termination nodes of the transport network according to examples of the present disclosure. In second level aggregation nodes, baseband processing may be pooled, for example in a hub node of an Xhaul network, the second level aggregation node thus acting as a network side termination for the WDM channels transported over the network. The second level aggregation nodes may be connected to one or more first level aggregation nodes over a DWDM infrastructure. In first level aggregation nodes, reconfigurable remote nodes and GPON OLTs may be located. The first level aggregation nodes drop WDM channels assigned to antenna sites connected to the node or to the node's GPON, and allow these channels to bypass the node's OLT without impacting processing in the OLT of the passive optical signals exchanged over the GPON. WDM and passive optical channels arriving at a termination node of the GPON may be separated and forwarded to their correct destinations.

Aspects of the present disclosure thus allow for converge of fixed and mobile traffic leveraging without requiring changes to existing GPON infrastructure. Thanks to the re-configurability enabled by the WDM architecture, including second level aggregation nodes and reconfigurable remote nodes hosted at first level aggregation nodes, it is possible to upgrade the network, for example adding small cells (e.g. for business areas) and macro antennas on the GPON infrastructure step by step. As new cells and/or antennas are installed on branches of a GPON in the transport network, control functions may reconfigure the allocation of WDM wavelengths and so reconfigure remote nodes with the appropriate wavelengths to be dropped onto the or each GPON. Aspects of the present disclosure thus allow a RAN to migrate to 5G smoothly with all advantages of the Xhaul solution, including capability to configure and rearrange the traffic dynamically according traffic needs, and support of any type of radio splitting. The combined WDM and GPON infrastructure ensures that the limited geographical reach of a GPON (2-3 km) is not a barrier to exploitation of CRAN Xhaul advantages over longer distances (~20 km). Aspects of the present disclosure also provide a cost effective alternative to the tuneable filters usually proposed for through the use of wavelength selective elements. Such wavelength selective elements may also avoid the need for complicated communication mechanism between OLT and ONT for the stabilization of the transmission wavelength at the ONT.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended items. The word "comprising" does not exclude the presence of elements or steps other than those listed in a claim, "a" or "an" does not exclude a plurality, and a single processor or other unit may fulfil the functions of several units recited in the items. Any reference signs in the items shall not be construed so as to limit their scope.

The invention claimed is:

1. A method in a termination node of a transport network, the transport network comprising a first level aggregation node, a second level aggregation node and a Passive Optical Network, the method comprising:
    receiving, from the first level aggregation node, a combined signal including a plurality of wavelength division multiplexing, WDM, channels having wavelengths in a first spectrum section and a passive optical channel having a wavelength in a second spectrum section, different from the first spectrum section;
    splitting the passive optical channel from the plurality of WDM channels and their respective wavelengths, and forwarding the passive optical channel to a destination node for the passive optical channel;
    forwarding at least some of the plurality of WDM channels and their respective wavelengths to destination nodes for the plurality of WDM channels, or dropping at least some of the plurality of WDM channels as a destination node for the plurality of WDM channels;
    receiving a WDM channel for transmission over the transport network;
    setting each of a plurality of wavelength selective elements to drop a single channel wavelength of the plurality of WDM channels on which they act, where each of the plurality of wavelength selective elements are configured to act on a different single channel wavelength to perform one of dropping the different single channel wavelength or bypassing the different single channel wavelength;
    sweeping a tuneable laser over the plurality of WDM channels and their respective wavelengths including a target transmission wavelength;
    inputting a signal of the tuneable laser to the plurality of wavelength selective elements and monitoring power on a drop output of each of the plurality of wavelength selective elements;

when the power on the drop output of a wavelength selective element of the plurality of wavelength selective elements corresponding to the target transmission wavelength reaches a transmission threshold, stopping the sweep of the tuneable laser, setting the wavelength selective element corresponding to the target transmission wavelength to bypass and transmitting the received WDM channel on the target transmission wavelength via the tuneable laser; and the termination node being an Optical Network Termination, ONT.

2. The method according to claim 1, wherein the termination node comprises a termination node of the Passive Optical Network.

3. The method according to claim 1, further comprising:
after splitting, inputting the plurality of WDM channels and their respective wavelengths to at least one wavelength selective element, the at least one wavelength selective element configured to act on a single channel wavelength of the plurality of WDM channels to perform one of dropping the single channel wavelength or bypassing the single channel wavelength;
wherein forwarding at least some of the plurality of WDM channels and their respective wavelengths to destination nodes for the plurality of WDM channels comprises forwarding the single channel wavelength bypassed by the at least one wavelength selective element.

4. The method according to claim 1, wherein the plurality of WDM channels and their respective wavelengths carry data signals for at least one of:
a Radio Access Network; an enterprise network; and a fixed access network.

5. The method according to claim 4, wherein the data signals for a Radio Access Network comprise at least one of: fronthaul signals; and backhaul signals.

6. The method according to claim 3, further comprising:
causing at least one WDM channel of the plurality of WDM channels dropped by the at least one wavelength selective element to be extinguished.

7. The method according to claim 6, wherein causing the at least one WDM channel dropped by the at least one wavelength selective element to be extinguished comprises performing at least one of attenuating or tapering on the at least one WDM channel.

8. The method according to claim 3, further comprising:
configuring the at least one wavelength selective element to bypass the single channel wavelength allocated to destination nodes connected to the termination node.

9. The method according to claim 1, further comprising:
receiving a signal indicating the target transmission wavelength.

10. The method according to claim 1, further comprising, during transmission of the received WDM channel on the target transmission wavelength:
monitoring power on the drop output of the wavelength selective element corresponding to the target transmission wavelength; and
if the power on the drop output of the wavelength selective element corresponding to the target transmission wavelength reaches a reset threshold, performing at least one of:
stopping transmission of the received WDM channel, resetting the wavelength selective element corresponding to the target transmission wavelength to drop the different channel wavelength on which it acts and restarting sweep of the tuneable laser; or adjusting the wavelength of the tuneable laser until the power on the drop output of the wavelength selective element corresponding to the target transmission wavelength falls below the reset threshold.

11. A termination node of a transport network, the transport network comprising a first level aggregation node, a second level aggregation node and a Passive Optical Network, the termination node comprising:
an input for receiving, from the first level aggregation node, a combined signal including a plurality of wavelength division multiplexing, WDM, channels having wavelengths in a first spectrum section and a passive optical channel having a wavelength in a second spectrum section, different from the first spectrum section;
a splitter for splitting the passive optical channel from the plurality of WDM channels and their respective wavelengths;
a first output for forwarding the passive optical channel to a destination node for the passive optical channel;
a second output for forwarding at least some of the plurality of WDM channels and their respective wavelengths to destination nodes for the plurality of WDM channels or dropping at least some of the plurality WDM channels as a destination node for the plurality of WDM channels;
an input for receiving a WDM channel for transmission over the transport network;
a tuneable laser for sweeping over the plurality of WDM channels and their respective wavelengths including a target transmission wavelength;
a plurality of wavelength selective elements, where each of the plurality of wavelength selective elements are configured to act on a different single channel wavelength to perform one of dropping the different single channel wavelength or bypassing the different single channel wavelength;
a plurality of monitors for monitoring power on a drop output of each of the plurality of wavelength selective elements; and
the termination node being an Optical Network Termination, ONT.

12. The termination node according to claim 11, wherein the termination node comprises a termination node of the Passive Optical Network.

13. The termination node according to claim 11, further comprising:
at least one wavelength selective element, the at least one wavelength selective element configured to act on a single channel wavelength of the plurality of WDM channels to perform one of dropping the single channel wavelength or bypassing the single channel wavelength;
wherein the second output is for forwarding or dropping the single channel wavelength bypassed by the at least one wavelength selective element to destination nodes for those WDM channels.

14. The termination node according to claim 13, wherein the at least one wavelength selective element comprises a micro-ring resonator.

15. The termination node according to claim 14, wherein the at least one wavelength selective element further comprises at least one of a taper or an attenuator coupled to a drop port of the micro-ring resonator.

16. The termination node according to claim 13, wherein the at least one wavelength selective element comprises at least one of an optical attenuator or switch coupled to an output port of an optical demultiplexer and an input port of an optical multiplexer.

17. A termination node of a transport network, the transport network comprising a first level aggregation node, a second level aggregation node and a Passive Optical Network, the termination node comprising a processor and a memory, the memory containing instructions executable by the processor such that the node is operable to:
- receive, from the first level aggregation node, a combined signal including a plurality of wavelength division multiplexing, WDM, channels having wavelengths in a first spectrum section and a passive optical channel having a wavelength in a second spectrum section, different from the first spectrum section;
- split the passive optical channel from the plurality of WDM channels and their respective wavelengths and forwarding the passive optical channel to a destination node for the passive optical channel;
- forward at least some of the plurality of WDM channels and their respective wavelengths to destination nodes for the plurality of WDM channels or drop at least some of the plurality of WDM channels and their respective wavelengths as a destination node for the plurality of WDM channels;
- receive a WDM channel for transmission over the transport network;
- set each of a plurality of wavelength selective elements to drop a single channel wavelength of the plurality of WDM channels on which they act, where each of the plurality of wavelength selective elements are configured to act on a different single channel wavelength to perform one of dropping the different single channel wavelength or bypassing the different single channel wavelength;
- sweep a tuneable laser over the plurality of WDM channels and their respective wavelengths including a target transmission wavelength;
- input a signal of the tuneable laser to the plurality of wavelength selective elements and monitoring power on a drop output of each of the plurality of wavelength selective elements;
- when the power on the drop output of a wavelength selective element of the plurality of wavelength selective elements corresponding to the target transmission wavelength reaches a transmission threshold, stop the sweep of the tuneable laser, set the wavelength selective element corresponding to the target transmission wavelength to bypass and transmitting the received WDM channel on the target transmission wavelength via the tuneable laser; and
- the termination node being an Optical Network Termination, ONT.

* * * * *